United States Patent
Garcia et al.

(10) Patent No.: US 11,645,282 B1
(45) Date of Patent: May 9, 2023

(54) DATA RETRIEVAL INTERFACE WITH REQUEST ROUTING BASED ON CONNECTIVITY AND LATENCY TO DATA SOURCES

(71) Applicant: Amazon Technologies, Inc., Seattle, WA (US)

(72) Inventors: Michael Garcia, New York, NY (US); David Joseph Mifsud, Bothell, WA (US); Edwin Ricardo Mendez Rodriguez, Seattle, WA (US); David Wayne Lasley, Kent, WA (US); Pratibha Rawat, Foster City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 17/037,376

(22) Filed: Sep. 29, 2020

(51) Int. Cl.
| | | |
|---|---|---|
| *G06F 16/2453* | (2019.01) | |
| *G06F 16/2458* | (2019.01) | |
| *G07C 5/00* | (2006.01) | |
| *G16Y 10/75* | (2020.01) | |
| *H04L 67/12* | (2022.01) | |
| *H04L 67/1097* | (2022.01) | |
| *G06F 16/25* | (2019.01) | |
| *G06F 16/245* | (2019.01) | |
| *H04L 67/63* | (2022.01) | |

(52) U.S. Cl.
CPC ...... *G06F 16/24549* (2019.01); *G06F 16/245* (2019.01); *G06F 16/2471* (2019.01); *G06F 16/258* (2019.01); *G07C 5/008* (2013.01); *G16Y 10/75* (2020.01); *H04L 67/1097* (2013.01); *H04L 67/12* (2013.01); *H04L 67/63* (2022.05)

(58) Field of Classification Search
None
See application file for complete search history.

(56) References Cited

U.S. PATENT DOCUMENTS

| | | | | |
|---|---|---|---|---|
| 10,417,194 | B1* | 9/2019 | Desai | G06F 16/182 |
| 2007/0192300 | A1* | 8/2007 | Reuther | G06F 16/2452 |
| 2019/0036781 | A1* | 1/2019 | Prabhu | H04L 67/34 |
| 2019/0320022 | A1* | 10/2019 | Raghunath | H04L 67/1097 |
| 2019/0386923 | A1* | 12/2019 | Ingerman | G06F 8/65 |
| 2020/0204618 | A1* | 6/2020 | Agarwal | H04L 9/3247 |

(Continued)

OTHER PUBLICATIONS

"GraphQL," Copyright 2019-present, GraphQL Foundation, downloaded from http://spec/graph.ql.org/draft/ on Sep. 29, 2020, pp. 1-68.

(Continued)

*Primary Examiner* — Jeffrey R Swearingen
(74) *Attorney, Agent, or Firm* — Alexander A. Knapp; Kowert, Hood, Munyon, Rankin & Goetzel, P.C.

(57) ABSTRACT

A system comprising one or more computers implements a data retrieval interface. The data retrieval interface provides a unified schema definition language for data queries. Also the data retrieval interface implements a routing layer that applies default or custom prioritization parameters to select a data source from which to obtain data requested in a query from an application. The data retrieval interface may take into consideration connectivity, latency, costs, or other user specified parameters when selecting a data source and/or when selecting connection path to a selected data source to be used to obtain data in response to a query.

22 Claims, 16 Drawing Sheets

(56) References Cited

U.S. PATENT DOCUMENTS

2020/0349080 A1* 11/2020 Radi .................. G06F 12/0862
2020/0412806 A1* 12/2020 Largman ............... H04L 51/222
2021/0073235 A1* 3/2021 Li ....................... G06F 16/2471

OTHER PUBLICATIONS

U.S. Appl. No. 16/835,070, filed Mar. 30, 2020, Brett Francis, et al.
U.S. Appl. No. 16/917,836, filed Jun. 30, 2020, Mingwen Dong, et al.

* cited by examiner

DATA RETRIEVAL INTERFACE WITH REQUEST ROUTING BASED ON CONNECTIVITY AND LATENCY TO DATA SOURCES

BACKGROUND

With the advent of cloud computing, edge computing, and mobile technologies, the variety of hardware locations and/or operating environments in which data needed by an application may be stored, or retrieved from, has expanded. For example, an application may be executed in a variety of physical execution environments that are implemented on a variety of hardware systems and data may be stored in any of these physical execution environments/hardware systems. Also, data may be stored remotely, such as in a cloud data storage. Additionally, an application may need to access data from a different physical execution environment/hardware system that is different from a physical execution environment/hardware system in which the application is currently executing.

Also, network conditions, connectivity, etc. between a given physical execution environment in which an application is executing and other hardware systems may change depending on circumstances that are not easily predictable. For example, a mobile computing device may be able to access a remote data source with low latency in some locations and may not be able to access the remote data source at all in other locations, or may only be able to access the remote data source with a high latency connection in some locations.

Figure 1A:
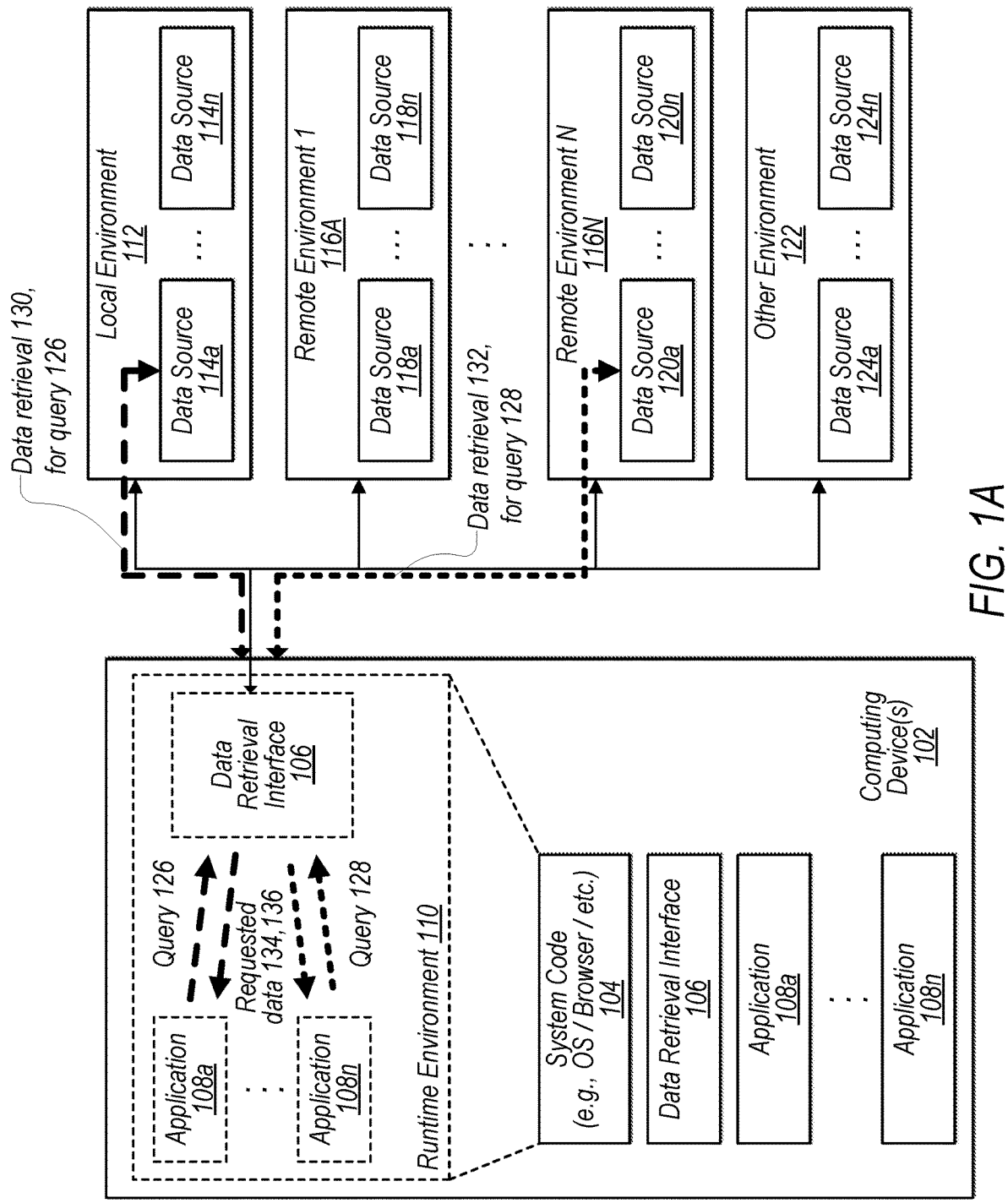
FIG. 1A illustrates a runtime environment of a computing device, wherein applications executing in the runtime environment query a standardized data retrieval interface for data, and wherein the standardized data retrieval interface selects a data source from which to obtain the requested data, wherein the selection of the data source is based on connectivity and/or latency between the data retrieval interface and a plurality of potential data sources, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a standardized data retrieval interface that is configured to provide a unified schema definition language for data queries. The standardized data retrieval interface includes a routing layer that selects a data source from which to retrieve data in response to a query from an application, wherein the selection is based, at least in part, on latency, cost, and/or connectivity between the standardized data retrieval interface and one or more data sources that can provide the requested data. Additionally, the standardized data retrieval interface provides a data abstraction layer, wherein formatting and connection details required to interact with a selected data source are managed by the standardized data retrieval interface and abstracted from the application making the query.

In some embodiments, the standardized data retrieval interface may communicate with any type of backend system, such as various types of databases, storage devices, physical sensors, synthetic sensors, device digital twins, etc. to retrieve data in response to a query. Also, the standardized data retrieval interface may be configured to communicate with the various types of backend systems using various different connection paths, such as Wi-Fi connections, cellular connections, remote network connections (e.g. via an Internet connection or a private network connection), a local wireless connection (e.g. such as Bluetooth connection, etc.), or various other connection paths.

In some embodiments, the standardized data retrieval interface may be configured to receive queries for data objects formatted using an object type field and additional fields that further define the requested data object. In some embodiments, the standardized data retrieval interface follows a language-agnostic query format such that applications running in a variety of operating system environments or coded in a variety of programming languages may interact with the standardized data retrieval interface using standardized query formats that can be used regardless of the operating system in which the application is running or a programming language used for the application. This may simplify the design process of applications for application developers in that a single unified schema may be used for data queries directed to the standardized data retrieval interface regardless of a particular operating environment and/or coding language in which the application executes.

Also, because data to be accessed by an application may be stored in various physical hardware systems and connections to these hardware systems may have varying latencies and/or costs based on network conditions, or may not have connectivity at all, it may be difficult for application developers to write applications that can adapt to the unknown circumstances in which the application will execute. For example, a given application may execute on a mobile device and may have low latency/low cost access to data sources in a remote cloud service provider network environment under certain conditions or at a given location, but may have high latency/high cost access to the remote cloud data sources in other conditions or at a different location. Also, other types of data sources may or may not be available based on circumstances, such as data retrievable from another device connected to a hardware environment in which the application executes, such as a connection via Bluetooth, Wi-Fi, etc.

In some embodiments, instead of including application code that attempts to predict all the possible locations in which data needed by the application may be stored, and further how to interface with data sources storing the needed data, and which connection path to use to access the data at the data sources. An application code may be written using a standard query format to generate an application programmatic interface (API) call to a standardized data retrieval interface, wherein the data retrieval interface manages connections to various different backend data sources that may require different connection protocols that may be accessible with different and changing latencies and costs, or may not be available at all. Additionally, the standardized data retrieval interface may make intelligent routing decisions for retrieving data in response to a query when there are more than one possible data source from which to retrieve the requested data. For example, a standardized data retrieval interface may maintain up-to-date information regarding retrieval latencies and/or costs for various data sources and/or availability of a connection to the various data sources. Thus, an application may simply make a single query to a standardized data retrieval interface (which may be implemented as an application programmatic interface API) and the standardized data retrieval interface may manage the selection of a data source from which to retrieve the requested data based on latency, cost, and/or connectivity. Furthermore the standardized data retrieval interface may further manage request syntax needed to interact with the various data sources. Additionally, the standardized data retrieval interface may filter and format data received from a selected data source such that a response provided to the application making the query follows a standardized format. In this way the complexities of intelligently selecting a data source taking into account data retrieval latencies, costs, connection protocols and syntax required by various data sources may be offloaded from the application and instead managed by a standardized data retrieval interface.

In some embodiments, a standardized data retrieval interface may further or alternatively intelligently select a data source from which to retrieve data in response to a query based on costs in addition to or instead of latency. For example, retrieving data from a local environment, such as a local memory or storage device of a computing system in which the application executes may have a lower cost, whereas retrieving data from a remote environment, such as via a cellular network, may have a higher cost. Also, retrieving data from an intermediate environment, such as another device connected to the computing device executing the application via a Wi-Fi, Bluetooth, or other wired or wireless connection may have a lower cost as compared to retrieving the data using a cellular connection. In some embodiments, a standardized data retrieval interface may prioritize data sources from which to retrieve data based on latency, costs, or a combination of both. In some embodiments, other prioritization parameters may be used. Also, in some embodiments an administrator may specify prioritization parameters to be used by a standardized data retrieval interface to select a data source from which to retrieve data. Also, in some embodiments, a data query may specify one or more prioritization parameters to be used in selecting a data source from which to retrieve data in response to the query.

In some embodiments, a standardized data retrieval interface may synchronize data between multiple data sources and/or resolve conflicts in the data. For example, a standardized data retrieval interface may add data fetched from a remote environment to a local environment and synchronize the data between the local and remote environment and/or resolve conflicts in data stored in the local and remote environments. In some embodiments, parameters for use in synchronizing data between data sources and resolving conflicts in data stored in different data sources may be configurable and may be modified by an administrator of a standardized data retrieval interface.

Also in some embodiments, a standardized data retrieval interface may proxy queries between a plurality of standardized data retrieval interfaces. For example, a first standardized data retrieval interface may include another standardized data retrieval interface as one of a plurality of data sources to which a retrieval request may be sent. In this way, standardized data retrieval interfaces may be chained together across devices or across execution environments. For example, a standardized data retrieval interface implemented in an in-vehicle system environment of a vehicle may list a possible data source for selection that is another standardized data retrieval interface implemented in a runtime environment of a mobile device, such as a phone, connected to the in-vehicle system via a Bluetooth connection. Thus a query may be sent from an application executing in the in-vehicle system to the standardized data retrieval interface implemented in the in-vehicle system. This in-vehicle standardized data retrieval interface may select the mobile device standardized data retrieval interface as a best option for obtaining the data requested in the query and may proxy the query on to the standardized data retrieval interface included in the runtime environment of the mobile device. This mobile device standardized data retrieval interface may then select a data source from which to obtain the data requested in the query and return the requested data to the in-vehicle standardized data retrieval interface, which may in turn provide the requested data to the application executing in the in-vehicle system environment that sent the query. In this way, the in-vehicle system standardized data retrieval interface may not need to be continuously updated, for example, based on changes in cellular network connectivity, etc. but may instead further offload those considerations to the chained standardized data retrieval interface of the mobile device.

In some embodiments, a standardized data retrieval interface may fetch stored data or may fetch real-time data, such as from a physical sensor, synthetic sensor, another application that is executing, a program execution environment, etc. In some embodiments a synthetic sensor may be implemented in a synthetic sensor orchestration environment. In some embodiments, a synthetic sensor orchestration environment, may enable an OEM manufacturer, an OEM parts manufacturer, or a third party to deploy a synthetic sensor into a synthetic sensor orchestration environment that allows and/or disallows flows of sensor data from existing physical sensors in the same or different domains to flow to a new synthetic sensor and that further allows the addition of new logical code for the new synthetic sensor that uses the sensor data from existing physical sensors to determine new outputs. The output of the synthetic sensor may then be an input to another system or application, such as an application running in a runtime environment.

In some embodiments, various domains or operating systems included in a vehicle may include an infotainment domain/OS, a cockpit or control domain/OS, a communications domain/OS, a safety system domain/OS, a vehicle server domain/OS, a telematics communication unit domain/OS, an advanced drive assistance system domain/OS, a cloud domain/OS, an edge processing domain/OS (which may be implemented in part in a cellular communications tower, etc.), and/or a gateway domain/OS. The vehicle may include a common communications bus, but the different domains may be separate branches off of the bus, or data flowing over the bus may not be accessible in all of the domains. In some embodiments, data sources in some or all of these vehicle domains may be included as possible data sources from which a standardized data retrieval interface, such as one implemented in an in-vehicle runtime environment, may obtain data.

According to one embodiment, a system includes one or more computing devices configured to implement a data retrieval interface in a runtime environment. The data retrieval interface is configured to receive a query for data, wherein the query is formatted in a standardized format supported by the data retrieval interface. The data retrieval interface is also configured to select a data source from which to retrieve the data requested in the query, wherein the selection is based on connectivity or latency between the runtime environment and respective ones of a plurality of data sources. The data retrieval interface is also configured to retrieve data comprising the requested data from the selected data source and provide the requested data in response to the query. Of the data sources from which the selected data source is selected by the data retrieval interface at least some of the data sources are implemented using hardware in a local environment, local to where the one or more computing devices that implement the runtime environment are located. Also, at least some of the plurality of data sources are implemented on hardware that is located remotely from the local environment where the one or more computing devices that implement the runtime environment are located.

According to one embodiment, one or more non-transitory computer readable media store program instructions, that when executed on or across one or more processors, cause the one or more processors to receive a request for data, wherein the request is formatted in a standardized format supported by a data retrieval interface; select a data source from which to retrieve the requested data, wherein the selection is based on connectivity or latency between the data retrieval interface and respective ones of a plurality of data sources; retrieve data comprising the requested data from the selected data source; and provide the requested data in response to the request.

According to one embodiment, a method includes receiving a request for data, wherein the request is formatted in a standardized format supported by a data retrieval interface; selecting a data source from which to retrieve the requested data, wherein the selection is based on connectivity or latency between the data retrieval interface and respective ones of a plurality of data sources; retrieving data comprising the requested data from the selected data source; and providing the requested data in response to the request.

FIG. 1A illustrates a runtime environment of a computing device, wherein applications executing in the runtime environment query a standardized data retrieval interface for data, and wherein the standardized data retrieval interface selects a data source from which to obtain the requested data, wherein the selection of the data source is based on connectivity and/or latency between the data retrieval interface and a plurality of potential data sources, according to some embodiments.

In some embodiments, a standardized data retrieval interface executes in a runtime environment (also referred to as an execution environment) of a computing device. For example, computing device(s) 102 include system code 104 that implements runtime environment 110 when executed by one or more processors of computing device(s) 102. Computing device 102 also includes data retrieval interface 106 and applications 108*a* through 108*n*, which also execute in runtime environment 110. In some embodiments, runtime environment 110 may be implemented in various contexts or devices, such as a runtime environment of an operating system of a computer, an execution environment of a web browser, an operating system of a mobile device, such as a phone, tablet, laptop, etc. In some embodiments, runtime environment 110 may be implemented in various other hardware systems or other physical execution environments. In some embodiments, data retrieval interface 106 in runtime environment 110 may be implemented as an application programmatic interface (API) configured to receive data queries from applications executing in runtime environment 110, such as queries 126 and 128 from applications 108*a* through 108*n*, and configured to provide data to the applications in response to received queries, such as requested data 134 and 136 provided to applications 108*a* through 108*n*.

For example, data retrieval interface 106 receives data query 126 from application 108*a* and receives data query 128 from application 108*n*. The data retrieval interface may receive the queries 126 and 128 in a standardized format according to a unified schema definition language for data queries. For example, a data query may request a data object "phone number" and may include additional fields that specify other characteristics of the phone number, such as "driver". The data retrieval interface may then determine which data sources of a plurality of data sources store data including the driver's phone number.

For example, the driver's phone number may be stored in a local environment, such as an infotainment system of a vehicle in which the driver is riding, wherein the computing device implementing the runtime environment is located in the vehicle such as in the infotainment domain of the vehicle. For example computing device(s) 102 may be included in a vehicle and runtime environment 110 may execute in an infotainment domain of the vehicle.

Alternatively, or additionally, the driver's phone number may be stored in a remote location, such as an owner profile for the vehicle stored in a cloud service provider database. For example, data source 120*a* in remote environment 116*n* may be a database implemented in a cloud service provider network on behalf of a vehicle manufacturer, wherein the database stores profile information for owners of vehicles sold by the vehicle manufacturer. For example, the vehicle manufacturer may subscribe to cloud services from the cloud service provider to store data on behalf of the vehicle manufacturer, such as customer data.

Additionally, the driver phone number may be stored in a mobile device in the vehicle such as a mobile phone, tablet, laptop, etc. The mobile device may have a connection to a computing device in the vehicle infotainment domain, such as via a Bluetooth or Wi-Fi connection.

Thus in order to answer query 126 the data retrieval interface may need to select between the multiple data sources that include the driver's phone number to select a given one of the data sources from which to obtain the driver's phone number, e.g. the data requested in the data query 126 from the application 108*a*.

Continuing the example, data retrieval interface 106 may determine that data requested in data query 126 is stored in local environment 112, which for example may be included in computing device 102. Data source 114*a* of local environment 112 may be a memory of computing device 102 and data source 114*n* of local environment 112 may be a hard drive of computing device 102 or other storage device. In some embodiments, a data source 114*a* through 114*n* may be another application executing in runtime environment 110.

Additionally, data retrieval interface 106 may determine that the requested data requested by query 126 is also stored in a remote environment 116*a* or another remote environment 116*n*. The remote environments may include multiple data sources. For example, remote environment 116*a* includes data sources 118*a* through 118*n*. Also remote environment 116*n* includes data sources 120*a* through 120*n*. In some embodiments, a remote environment may be part of a cloud service provider network that is connected to computing device 102 via one or more network connections, such as an Internet connection, cellular network data connection, private network connection, etc.

In some embodiments, data sources in a remote environment, such as data sources 118*a* through 118*n* and data sources 120*a* through 120*n* may include a resolver that fetches data at the data source to fulfill the query. In some embodiments, the data sources in a remote environment, such as data sources 118*a* through 118*n* and data sources 120*a* through 120*n* may include a database implemented in the remote environment that can provide the data requested in the data query. In some embodiments, data sources in a remote environment, such as data sources 118*a* through 118*n* and data sources 120*a* through 120*n* may include an additional data retrieval interface, wherein data retrieval interface 106 proxies the query 126 on to the data retrieval interface in the other environment. Also, in some embodiments, data sources in a remote environment, such as data sources 118*a* through 118*n* and data sources 120*a* through 120*n* may include a digital twin that maintains state information for a device, such as an internet of things (IoT) enabled device that is subscribed to a cloud service provider network IoT service, wherein the IoT service maintains a device digital twin for the IoT enabled device.

In some embodiments, data retrieval interface 106 may further determine that the data requested by query 126 is included in another environment, such as intermediate environment 122, which includes data sources 124*a* through 124*n*. In some embodiments, computing device 102 may be a computing device, such as is included in a vehicle infotainment system and intermediate environment 122 may be a mobile device connected to the vehicle infotainment system, such as via a Bluetooth or Wi-Fi connection. In such an example, data sources 124*a* through 124*n* may include memory and storage devices of the mobile device.

In order to fulfill query 126, data retrieval interface 106 may prioritize available data sources from which the requested data may be retrieved. The data sources may be prioritized according to default prioritization parameters of data retrieval interface 106, or data retrieval interface 106 may be supplied with specified prioritization parameters, such as from an administrator, or such as with query 126. For example, in an embodiment in which computing device 102 is part of a vehicle infotainment domain, the vehicle manufacturer may serve as an administrator to data retrieval interface 106 and may supply prioritization parameters. For example, the vehicle manufacturer may specify prioritization parameters that prioritize local environment 112 over remote environments 116*a* through 1116*n*. However, if requested data is not available in local environment 112, the vehicle manufacturer's specified priorities may next prioritize a data source in a cloud service provider network allocated to the vehicle manufacturer, such as a database implemented on behalf of the vehicle manufacturer in a remote environment such as a cloud service provider network, for example remote environment 116*n*. Also, in some embodiments, a query may specify a prioritization, such as to prioritize remote or intermediate environments that can be accessed without incurring data transfer costs. For example, a data query may specify to prioritize data sources that can be reached via Bluetooth or Wi-Fi without using cellular data.

Based on the prioritization parameters to be applied when fulfilling query 126, data retrieval interface 106 may select a data source from which to fetch data requested in query 126. For example, data retrieval interface 106 may select to fetch the requested data from data source 114*a* in local environment 112, which may be a storage device or memory device of computing device(s) 102.

As another example, data retrieval interface 106 may apply a different set of prioritization parameters to query 128. When the different data prioritization parameters are applied, data retrieval interface 106 may select data source 120a in remote environment 116n as the data source from which to fetch the data requested in query 128. Alternatively, data retrieval interface 106 may apply the same prioritization parameters to query 128, but may determine that the requested data is not available in local environment 112 and may therefore select to retrieve the requested data from data source 120a in remote environment 116n.

The fetched data for query 126 may be provided to data retrieval interface 106 from data source 114a. In some embodiments the fetched data may include more data than the data targeted by query 126. For example, data source 114a may return a profile for the driver that also includes the driver's address along with phone number. In some embodiments, the data retrieval interface 106 may further filter out non-responsive data that is not responsive to query 126, such as the address that was provided in addition to the driver's phone number. Also, in some embodiments, the data retrieval interface may format the data into a standardized format, such as adding hyphens between the area code and main portion of the returned phone number.

In some embodiments, data retrieval interface 106 may further hydrate the local environment 112 with fetched data. For example, if the driver's profile was fetched from data source 120a of remote environment 116n because it was not stored in local environment 112, the data retrieval interface 106 may store the driver's profile in local environment 112 in addition to providing requested data 134 or requested data 136 in response to queries 126 and 128. In some embodiments, the data retrieval interface 106 may resolve conflicts in data when hydrating data into a local environment, such as local environment 112.

Figure 1B:
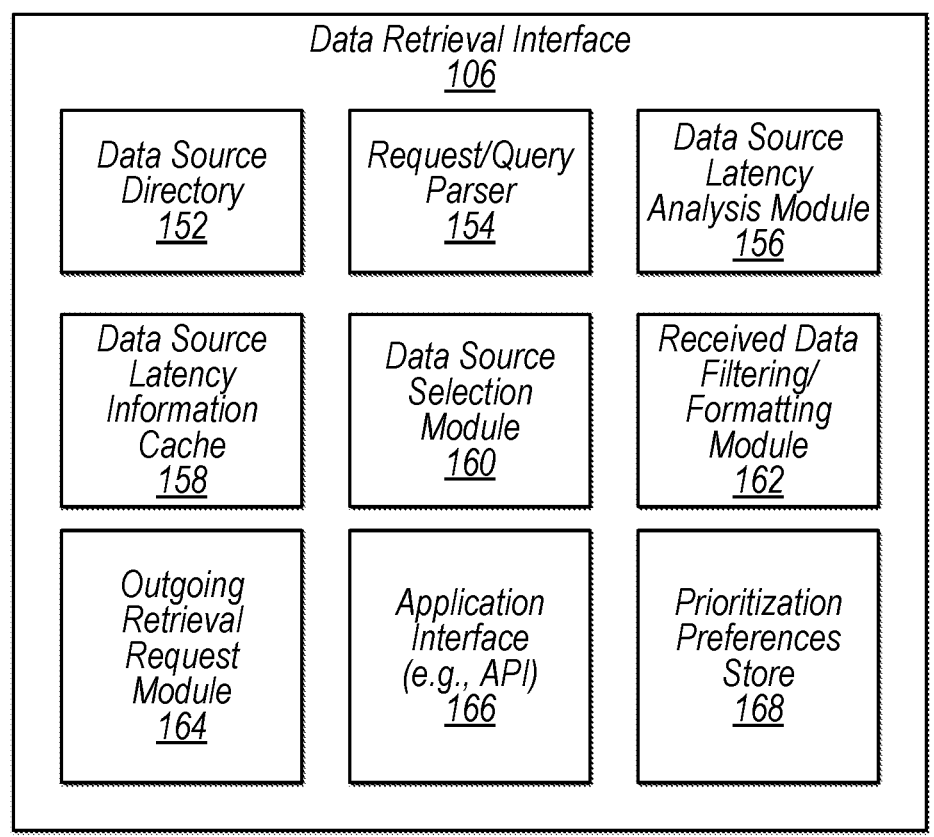
FIG. 1B illustrates example components of a standardized data retrieval interface, according to some embodiments.

FIG. 1B illustrates example components of a standardized data retrieval interface, according to some embodiments.

In some embodiments, a standardized data retrieval interface, such as data retrieval interface 106, includes a data source directory 152, a request/query parser 154, a data source latency analysis module 156, a data source latency cache 158, a data source selection module 160, a received data filtering and/or formatting module 162, an outgoing retrieval request module 164, an application interface 166, and a prioritization preferences store 168.

Data source directory store 152 may include information indicating data sources to which the data retrieval interface 106 may send a request to retrieve data as part of responding to a data query from an application. For example, in an embodiment in which data retrieval interface 106 is implemented in a runtime environment of a computer, the data source directory 152 may include information indicating storage devices of the computer that serve as local data sources. The data source directory may also include information indicating remote or intermediate data sources to which a connection may be established (or is already established) to retrieve data, such as a cloud service provider network that includes data sources, or another device to which a connection may be established (or is already established). In some embodiments, data source directory 152 may further include connection availability information for the data sources, or may be updated to only list data sources to which a connection is available. In some embodiments, data source directory 152 may further include information indicating types of data stored in different ones of the data sources, wherein the information indicating the data types may be used by the data source selection module 160 to determine if a given data source is likely to include data responsive to a query received from an application.

Request/query parser 154 may be configured to extract search parameters from a submitted request or query, wherein the request or query is formatted according to a standardized format. For example, in the example above regarding a query for a "phone number" data object that further specifies "driver", the request/query parser 154 may be configured to extract the requested data object type (e.g. phone number) from the query and may further be configured to extract the additional qualifiers included in the query, such as "driver." The request/query parser 154 may further provide these parameters extracted from the query to data source selection module 160 for use in selecting a data source to request data from in order to respond to the query. Also, the request/query parser 154 may provide such parameters to outgoing retrieval request module 164 for use in generating a request to a selected data source for data responsive to the query received from the application.

In some embodiments, data source selection module 160 may select more than one data source from which to retrieve data in order to respond to a query, such as query 126. As an example, the example query discussed above may further be a query for a "contact information" data object and may further include qualifiers, such as "driver". As an example the "contact information" data object may include phone number, address, and e-mail address. In some instances different ones of these components needed to answer the query may be available from different data sources. For example, the phone number may be retrieved from data source 114a in local environment 112, but the address or e-mail address may be retrieved from a different data source, such as data source 120n in remote environment 116N. As can be seen, in some embodiments, a standardized data retrieval interface, such as data retrieval interface 106, may be configured to retrieve data from multiple data sources in order to respond to a single query. Also, in some embodiments, the prioritization parameters for selecting a data source from which to retrieve data may be applied when selecting each of the data sources. Also, in some embodiments, prioritization parameters may include logic specific to a situation wherein data needed to respond to a query is included in different data sources. As an example prioritization, if both phone number and address are needed to respond to a query and the phone number is included in a lowest latency data source, but the address is not included in the lowest latency data source, prioritization parameters for the standardized data retrieval interface may prioritize a data source with access to all or more components of the data needed to respond to the query over the lowest latency data source. For example, the prioritization parameters may prioritize performing fewer retrieval operations to fewer data sources over retrieving each piece of component data needed to answer the query from a lowest latency data source with access to the respective specific piece of data. However, in other embodiments, a query may be answered in part, e.g. phone number when available, address when available, etc. such that the prioritization parameters may prioritize lowest latency data sources for each individual component of the data needed to answer the query as opposed to a slightly higher latency data source with all or more of the components needed to answer the query.

Data source latency analysis module 156 may determine data retrieval latencies for the data sources stored in data source directory 152. For example, in some embodiments, data source latency analysis module 156 may measure an elapsed amount of time between when a request for data is sent to a given data source and when a response is received back from the given data source. As discussed in more detail in FIGS. 4A/4B, data retrieval latencies may be determined and updated in various ways. For example, in some embodiments, a data retrieval latency for a data source may be updated on an on-going basis, such as in response to each subsequent data retrieval performed by the data source. In other embodiments, a data retrieval latency for a data source may be stored in a cache for a period of time (e.g. 1 minute, 5 minutes, etc.) and may be updated at the expiration of the period of time. For example, if a data retrieval latency is determined for a data retrieval performed by a given data source, the data retrieval latency may be stored in the cache (e.g. data source latency information cache 158) and may be updated after the time period has expired based on a subsequent data retrieval performed by the given data source. However, during the time period if additional data retrievals are performed by the given data source, new data retrieval latencies may not be determined until the cache period has elapsed. In some embodiments, other methods of determining data retrieval latencies for data sources may be used, such as sending a "ping" to the data sources and measuring a time that elapses until a response is received. Also other techniques may be used.

As mentioned above, determined data retrieval latencies for the data sources listed in data source directory 152 may be stored in data source latency information cache 158. These latencies may also be updated by data source latency analysis module 156, such that the data source latency information cache 158 stores up-to-data latencies for the respective data sources.

Data source selection module 160 may utilize search parameters received from request/query parser 154 along with data source latency information from data source latency information cache 158 to select a data source to attempt to retrieve data from in order to answer a query received from an application. In some embodiments, data source selection module 160 may apply default prioritization parameters, such as a preference to prioritize local data sources over remote data sources. Also, data source selection module 160 may apply specified parameters received from an administrator, which may be stored in prioritization preferences store 168. Additionally, or alternatively data source selection module 160 may apply preferences that may be provided by an application submitting the query. For example, the application may provide prioritization preferences with a query, such as a prioritization preference to avoid or assign a low priority to data sources that may incur data usage costs, such as retrieving data using a cellular data connection. In some embodiments, data source selection module 160 may follow processes such as illustrated and described in regard to FIGS. 2A-2C, 3, and 5-11 when selecting a data source from which to attempt to retrieve data in response to a query received from an application.

Received data filtering/formatting module 162 may filter data received from a data source to extract data requested by a query from an application. Also, the data filtering/formatting module 162 may format the data into a format expected by the application making the query. For example, received data filtering/formatting module 162 may filter out non-responsive data that is not responsive to a query. For example in the above example related to a query for a driver's phone number, the received data filtering/formatting module 162 may filter out non-responsive data received from a data source such as an address that was provided in addition to the driver's phone number. Also, in some embodiments, the received data filtering/formatting module 162 may format the data into a standardized format, such as adding hyphens between the area code and main portion of the returned phone number.

Outgoing retrieval request module 164 may manage establishing a connection to a selected data source using a selected connection path. For example, there may be multiple possible connection paths to the selected data source and one of the possible connection paths may be selected. Also, the outgoing retrieval request module 164 may generate a request to the selected data source using a format required by the selected data source. For example, if the selected data source is a cloud database, the outgoing retrieval request module 164 may generate a database query to the cloud database using a query format required by the cloud database. Also, the outgoing retrieval request module 164 may utilize query parameters provided by request/query parser 154 when formulating the query/request to be sent to the selected data source.

Application interface 166 may be an application programmatic interface (API) with which an application interacts to submit a query to data retrieval interface 106 and with which an application interacts to receive a response to a query from data retrieval interface 106. The application interface 166 may provide a standardized uniform interface with which applications can interact regardless of which operating system the application operate in and/or regardless of a programming language used for the application.

As mentioned above, prioritization preferences store 168 may store prioritization preferences to be used in selecting a data source to use in responding to a query and/or preferences to be used in selecting a connection path to a selected data source. In some embodiments, the prioritization preferences may include default prioritization parameters to be applied and may also include user submitted prioritization parameters, such as may be received from an administrator. Additionally, in some embodiments applications may provide prioritization parameters, such as with a query.

Figure 2A:
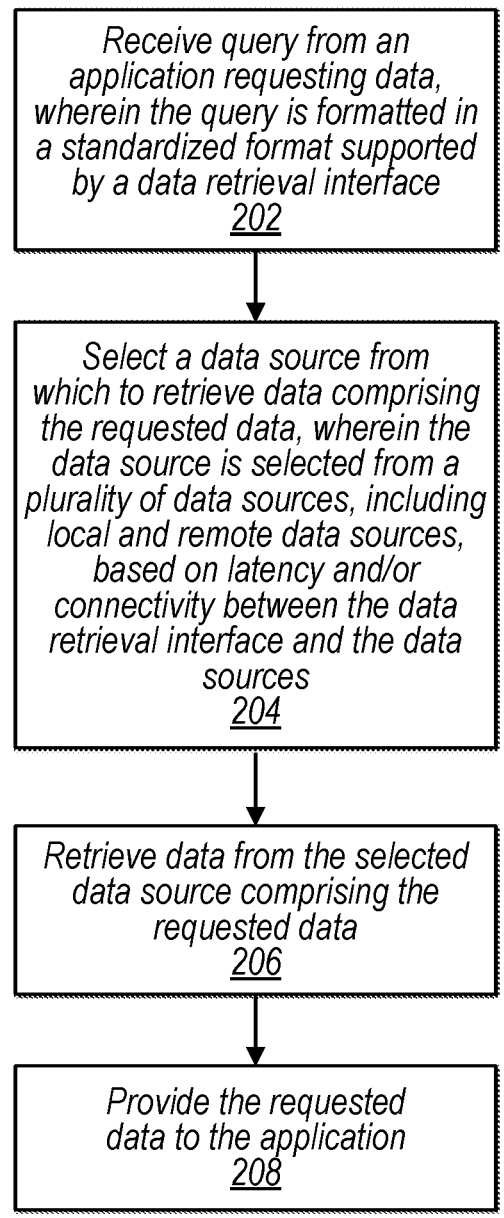
FIG. 2A illustrates a process performed by a standardized data retrieval interface to provide data in response to a query from an application, according to some embodiments.

FIG. 2A illustrates a process performed by a standardized data retrieval interface to provide data in response to a query from an application, according to some embodiments.

At 202, a standardized data retrieval interface, such as data retrieval interface 106, receives a query from an application requesting data, wherein the query is formatted in a standardized format supported by a standardized data retrieval interface. For example, the query may be received at an API of the standardized data retrieval interface and may be formatted using a unified schema definition language supported by the standardized data retrieval interface.

At 204, the standardized data retrieval interface selects a data source from which to retrieve data comprising the requested data, wherein the data source is selected from a plurality of data sources, including local and remote data sources, based on latency and/or connectivity between the standardized data retrieval interface and the data sources. Also in some embodiments, other factors may be used instead of, or in addition to, connectivity and latency to select a data source from which to retrieve data comprising the requested data. For example, in some embodiments, a user, such as an administrator may provide additional prioritization parameters such as cost of retrieving the data, etc. Also, in some embodiments, an application developer may provide prioritization parameters, such as by including prioritization parameters with a query submitted to the standardized data retrieval interface.

At 206, the standardized data retrieval interface retrieves data comprising the data requested in the query from the data source selected at 204. In some embodiments, if a highest ranked data source based on the prioritization parameters being applied by the standardized data retrieval interface is not available or does not have responsive data, a next highest ranking data source may be used. Thus, in some embodiments steps 204 and 206 may be iterative if the needed data is not available from or returned by the highest ranking data source.

At 208, the standardized data retrieval interface provides the requested data to the application. In some embodiments, the data provided to the application in response to the query may be a sub-set of data returned from the selected data source. Also, the data retrieval interface may reformat the data returned by the selected data source prior to providing response data to the application that submitted the query.

Figure 2B:
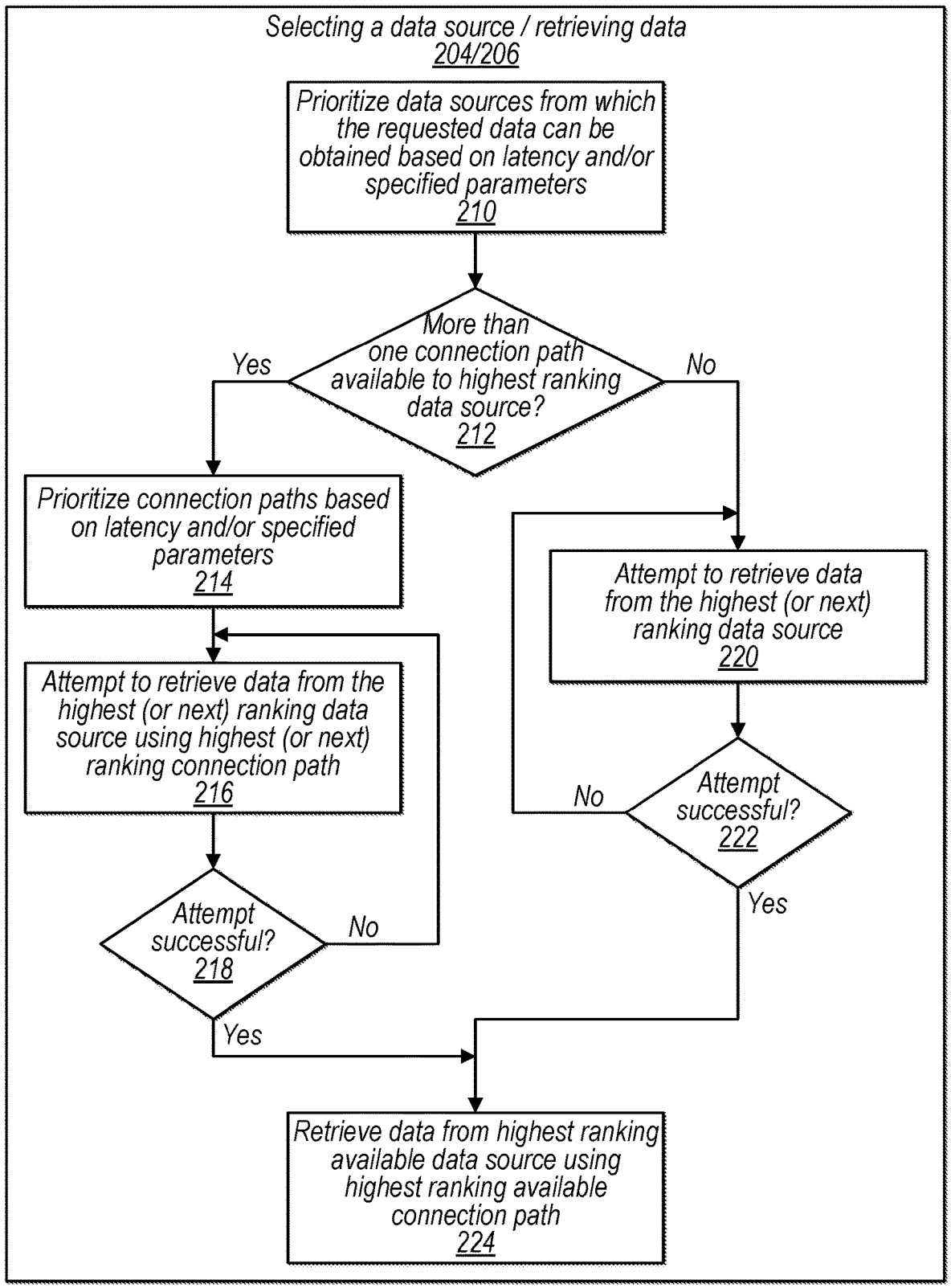
FIG. 2B illustrates additional details regarding how a standardized data retrieval interface selects a data source and retrieves data from the selected data source as part of responding to a query from an application, according to some embodiments.

FIG. 2B illustrates additional details regarding how a standardized data retrieval interface selects a data source and retrieves data from the selected data source as part of responding to a query from an application, according to some embodiments.

In some embodiments, the steps of selecting a data source and retrieving data from the selected data source as shown in 204 and 206 of FIG. 2A may further include a process as shown in FIG. 2B.

At 210, the standardized data retrieval interface prioritizes data sources from which the requested data can be obtained based on latency, connectivity, cost, and/or specified parameters. For example, local data sources may be given a higher priority than remote data sources. Also, data sources with lower data retrieval latencies may be given a priority over data sources with higher data retrieval latencies. Additionally, data sources that do not incur data charges, such as local data sources or data sources in an intermediate environment reachable via Wi-Fi or Bluetooth may be prioritized over data sources that incur data charges, such as data sources reachable using a cellular network connection.

At 212, the standardized data retrieval interface determines whether there is more than one available connection path to the highest ranking data source. If there is not more than one available connection path, at 220 the standardized data retrieval interface attempts to retrieve data from the highest ranking data source using the single available connection path. If there is more than one available connection path to the highest ranking data source, at 214 the standardized data retrieval interface prioritizes the available connection paths to the highest ranking data source based on latency, cost, and/or other specified parameters, such as may have been provided by an administrator or may have been provided with the query from the application.

At 216, the standardized data retrieval interface attempts to retrieve data from the highest ranking data source using the highest ranking available connection path.

If the attempt at 216 is unsuccessful, the standardized data retrieval interface may attempt to retrieve data from the highest ranking data source using the next highest ranking available connection path. Also, if a connection is not available to the highest ranking data source or the highest ranking data source does not include the data needed to answer the query, the standardized data retrieval interface, at 218, may determine that the attempt was not successful and may repeat 216 using a next highest ranked available connection path and/or next highest ranked data source. In a similar manner if it is determined at 222 that the attempt at 220 was unsuccessful, the standardized data retrieval interface may repeat 220 for a next highest ranking data source.

At 224, the standardized data retrieval interface retrieves data from highest ranking available data source using the highest ranking available connection path.

Figure 2C:
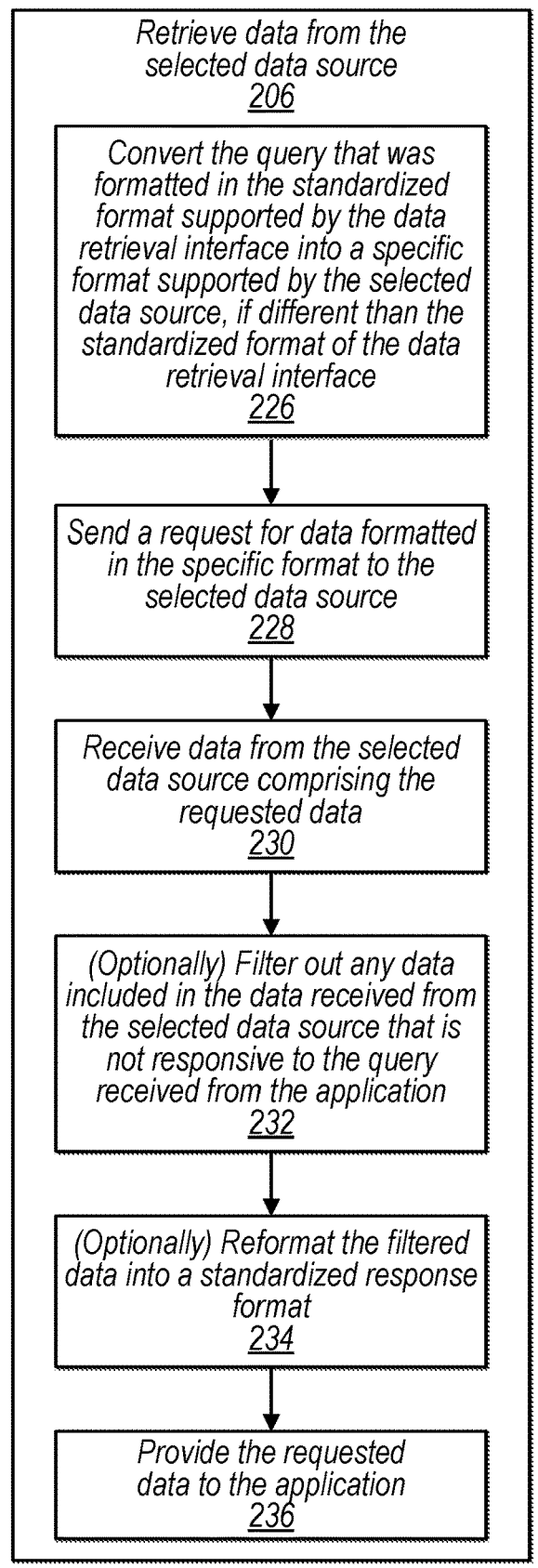
FIG. 2C illustrates additional details regarding how a standardized data retrieval interface interacts with a data source to obtain requested data and how the standardized data retrieval interface processes data received from the data source as part of providing requested data to an application, according to some embodiments.

FIG. 2C illustrates additional details regarding how a standardized data retrieval interface interacts with a data source to obtain requested data and how the standardized data retrieval interface processes data received from the data source as part of providing requested data to an application, according to some embodiments.

In some embodiments, as part of retrieving data from the selected data source as described in 206 of FIG. 2A a process as shown in FIG. 2C may be performed by a standardized data retrieval interface.

At 226, the standardized data retrieval interface converts the query that was formatted in the standardized format supported by the standardized data retrieval interface into a specific format supported by the selected data source, if different than the standardized format of the standardized data retrieval interface.

At 228, the standardized data retrieval interface sends a request for data formatted in the specific format to the selected data source. Also, at 230, the standardized data retrieval interface receives data from the selected data source comprising the requested data.

At 232, the standardized data retrieval interface may optionally filter out any data included in the data received from the selected data source that is not responsive to the query received from the application.

At 234, the standardized data retrieval interface may optionally reformat the filtered data into a standardized response format.

At 236, the standardized data retrieval interface provides the optionally filtered and optionally reformatted data to the application that submitted the query.

Figure 3:
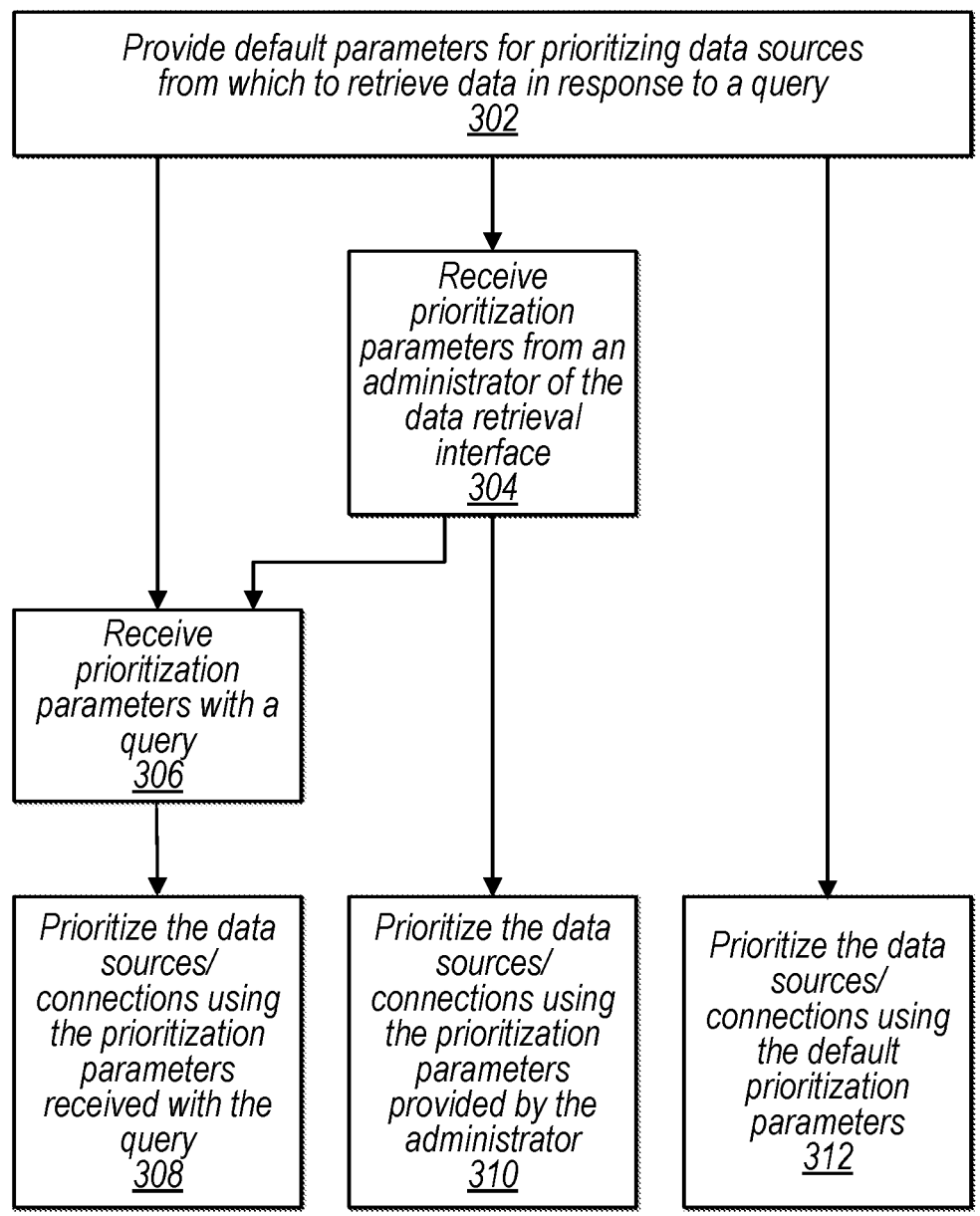
FIG. 3 illustrates a process followed by a standardized data retrieval interface to assign prioritization parameters to be used to select a data source from which to retrieve data in response to a query from an application, according to some embodiments.

FIG. 3 illustrates a process followed by a standardized data retrieval interface to assign prioritization parameters to be used to select a data source from which to retrieve data in response to a query from an application, according to some embodiments.

In some embodiments, a standardized data retrieval interface may be configured with default prioritization parameters and may further be custom configurable such that the standardized data retrieval interface applies prioritization parameters supplied by an administrator or provided with a query.

At 302, the standardized data retrieval interface is provided default parameters for prioritizing data sources from which to retrieve data in response to a query. If no custom parameters are received, or are not to be applied, at 312 the standardized data retrieval interface prioritizes data sources/connections using the default prioritization parameters.

At 304, the standardized data retrieval interface receives prioritization parameters from an administrator of the data retrieval interface. If no prioritization parameters are received that supersede the prioritization parameters received from the administrator, at 310, the standardized data retrieval interface prioritizes the data sources/connections using the prioritization parameters provided by the administrator.

At 306, the standardized data retrieval interface receives prioritization parameters with a query. If the prioritization parameters received with the query supersede the default or administrator provided prioritization parameters, at 308, the standardized data retrieval interface prioritizes the data sources/connections using the prioritization parameters received with the query.

Note that in some embodiments, administrator provided prioritization parameters may specify whether or not to allow query provided prioritization parameters to supersede the administrator provided prioritization parameters. Thus, in some embodiments, the query prioritization parameters may be disregarded or modified if such a configuration is established by the administrator.

Figure 4A:
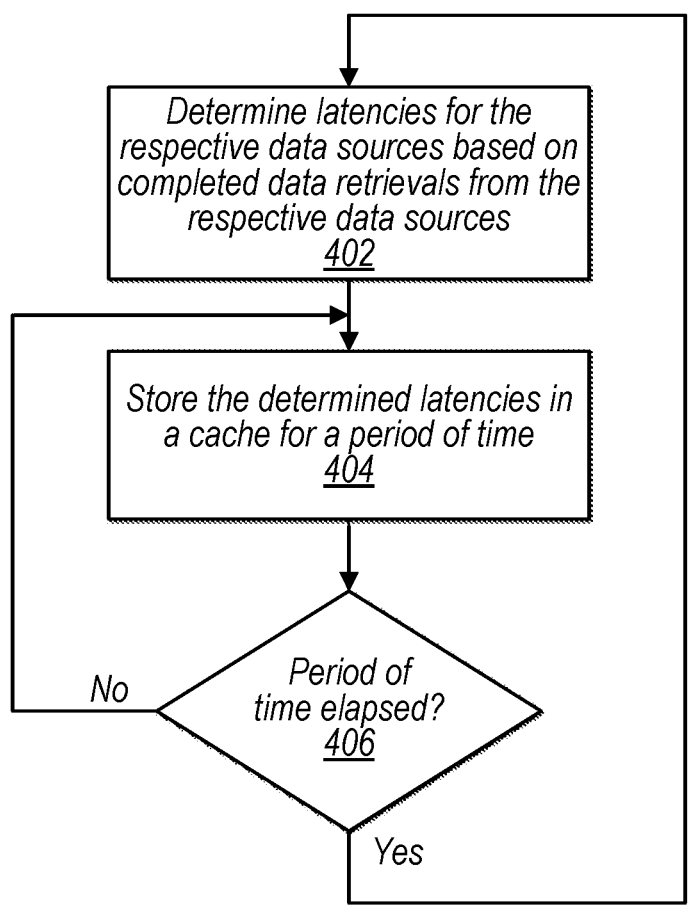
FIG. 4A illustrates an example process followed by a standardized data retrieval interface to determine retrieval latencies for data sources, according to some embodiments.

FIG. 4A illustrates an example process followed by a standardized data retrieval interface to determine retrieval latencies for data sources, according to some embodiments.

At 402, a standardized data retrieval interface determines latencies for the respective data sources based on completed data retrievals from the respective data sources.

At 404, the determined latencies are stored in a cache for a cache period, such as 1 minute, 5 minutes, etc. During the cache period the determined latencies stored in the cache are used for prioritization of data sources.

At 406, it is determined if the cache period has expired. If so, new latencies are determined for the data sources and stored in the cache for a next cache period. Note that in some embodiments, each data source may have its own cache period. For example, if a data retrieval latency is determined for a first data source at minute 0 and another data retrieval latency is determined for a second data source at minute 1 and a cache period is 5 minutes, the determined latency for the first data source may be cached from minutes 0 to 5 and the determined latency for the second data source may be cached from minute 1 to minute 6. Thus, a latency for each data source may expire at a time at the end of a cache period from which the retrieval latency for that data source was last determined.

Figure 4B:
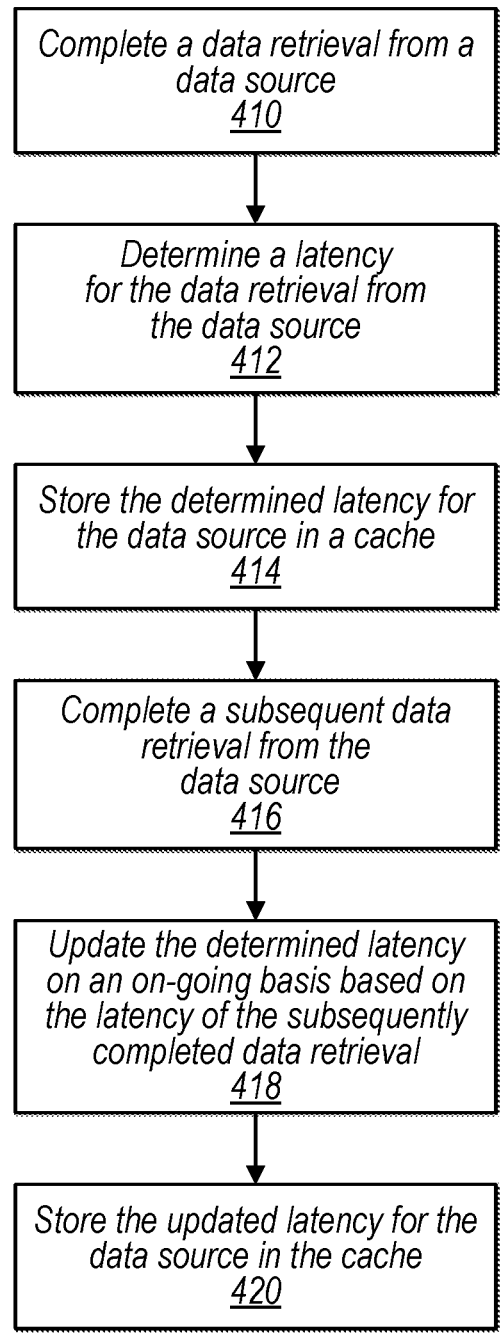
FIG. 4B illustrates another example process followed by a standardized data retrieval interface to determine retrieval latencies for data sources, according to some embodiments.

FIG. 4B illustrates another example process followed by a standardized data retrieval interface to determine retrieval latencies for data sources, according to some embodiments.

In other embodiments, data retrieval latencies maybe updated on an on-going basis as opposed to being stored for a cache period as described in FIG. 4A.

In such embodiments, at 410 a standardized data retrieval interface completes a data retrieval from a given data source.

At 412, the standardized data retrieval interface determines a latency for the data retrieval from the given data source. Note that the process described in FIG. 4B may be repeated for each of the data sources available to the standardized data retrieval interface.

At 414, the standardized data retrieval interface stores the determined data retrieval latency for the given data source in a cache of the standardized data retrieval interface.

At 416, the standardized data retrieval interface completes a subsequent data retrieval from the given data source.

At 418, the standardized data retrieval interface updates the determined latency for the given data source on an on-going basis based on the latency of the subsequently completed data retrieval at 416. For example, the data retrieval latency determined at 412 and the data retrieval latency determined at 418 may be averaged. Also, in some embodiments, a data retrieval latency determined at 418 may replace the data retrieval latency determined at 412 in the cache, such that the cache stores a most recently determined data retrieval latency. Whichever update method is used, at 420, the standardized data retrieval interface stores the updated data retrieval latency for the given data source in the cache. As mentioned above, this process may be performed for each of the data sources.

Figure 5:
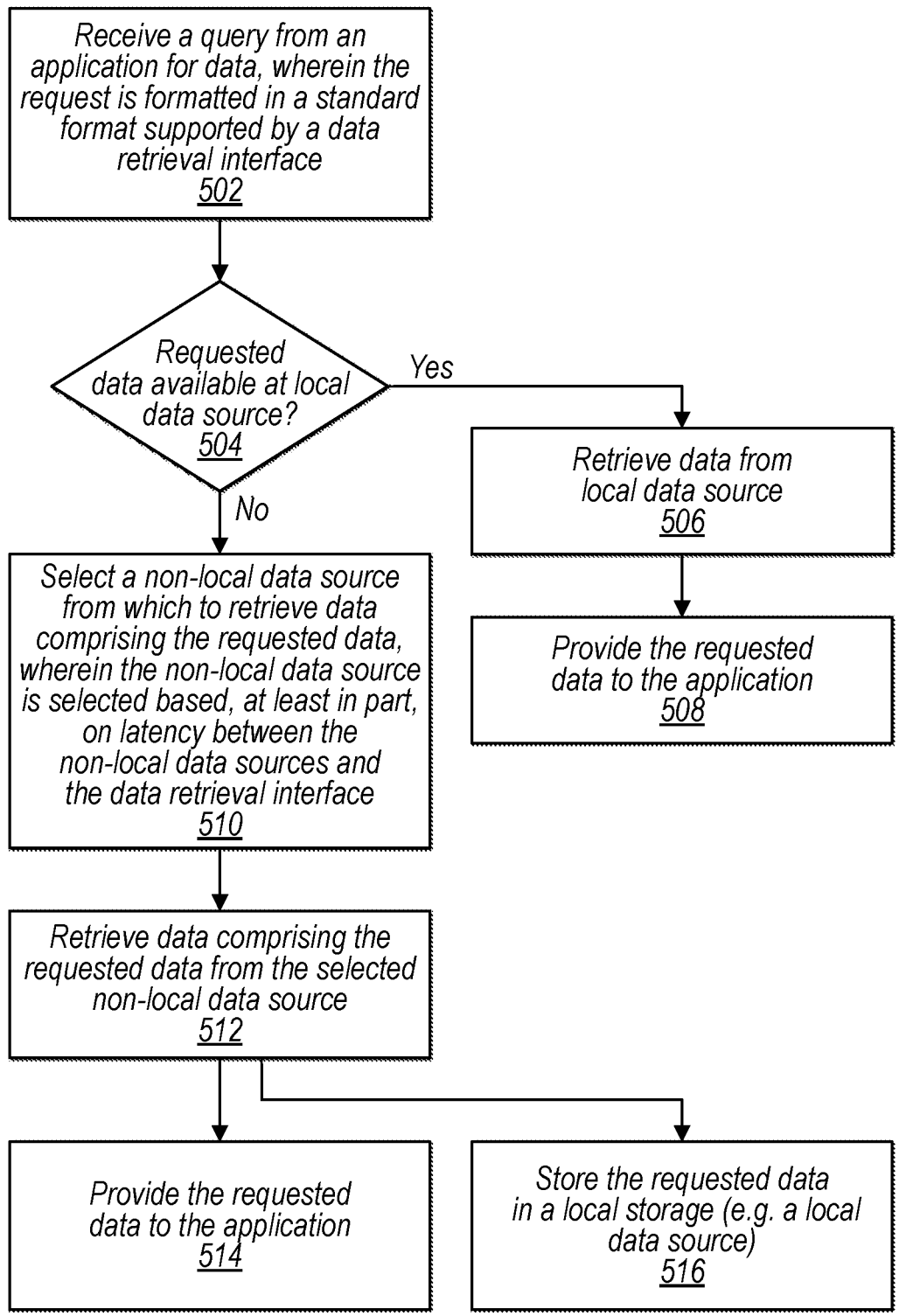
FIG. 5 illustrates a process performed by a standardized data retrieval interface to provide data in response to a query from an application, wherein the standardized data retrieval interface stores data retrieved from a non-local environment in a storage of a local environment if the data is not already stored in the local environment, according to some embodiments.

FIG. 5 illustrates a process performed by a standardized data retrieval interface to provide data in response to a query from an application, wherein the standardized data retrieval interface stores data retrieved from a non-local environment in a storage of a local environment if the data is not already stored in the local environment, according to some embodiments.

At 502, a standardized data retrieval interface receives a query from an application for data, wherein the request is formatted in a standard format supported by a data retrieval interface.

At 504, the standardized data retrieval interface determines whether requested data, requested in the query is available from a local data source. If so, at 506 the standardized data retrieval interface retrieves data comprising the requested data from the local data source. And, at 508, the standardized data retrieval interface provides the requested data to the application that submitted the query.

If the requested data is not available from a local data source, at 510, the standardized data retrieval interface selects a non-local data source from which to retrieve data comprising the requested data, wherein the non-local data source is selected based, at least in part, on latency between the non-local data source and the data retrieval interface.

At 512, the standardized data retrieval interface retrieves data comprising the requested data from the selected non-local data source.

At 514, the standardized data retrieval interface provides the requested data to the application that submitted the query.

Also, in some embodiments, at 516, the standardized data retrieval interface hydrates a local data source by storing the requested data in a local storage. Also in some embodiments, the standardized data retrieval interface may synchronize the local storage and the data received from the remote data source to resolve conflicts in the data and to ensure that the most up to date data is stored locally (e.g. the standardized data retrieval interface nay ensure that remote data that is stale does not overwrite more up to date local data).

Figure 6:
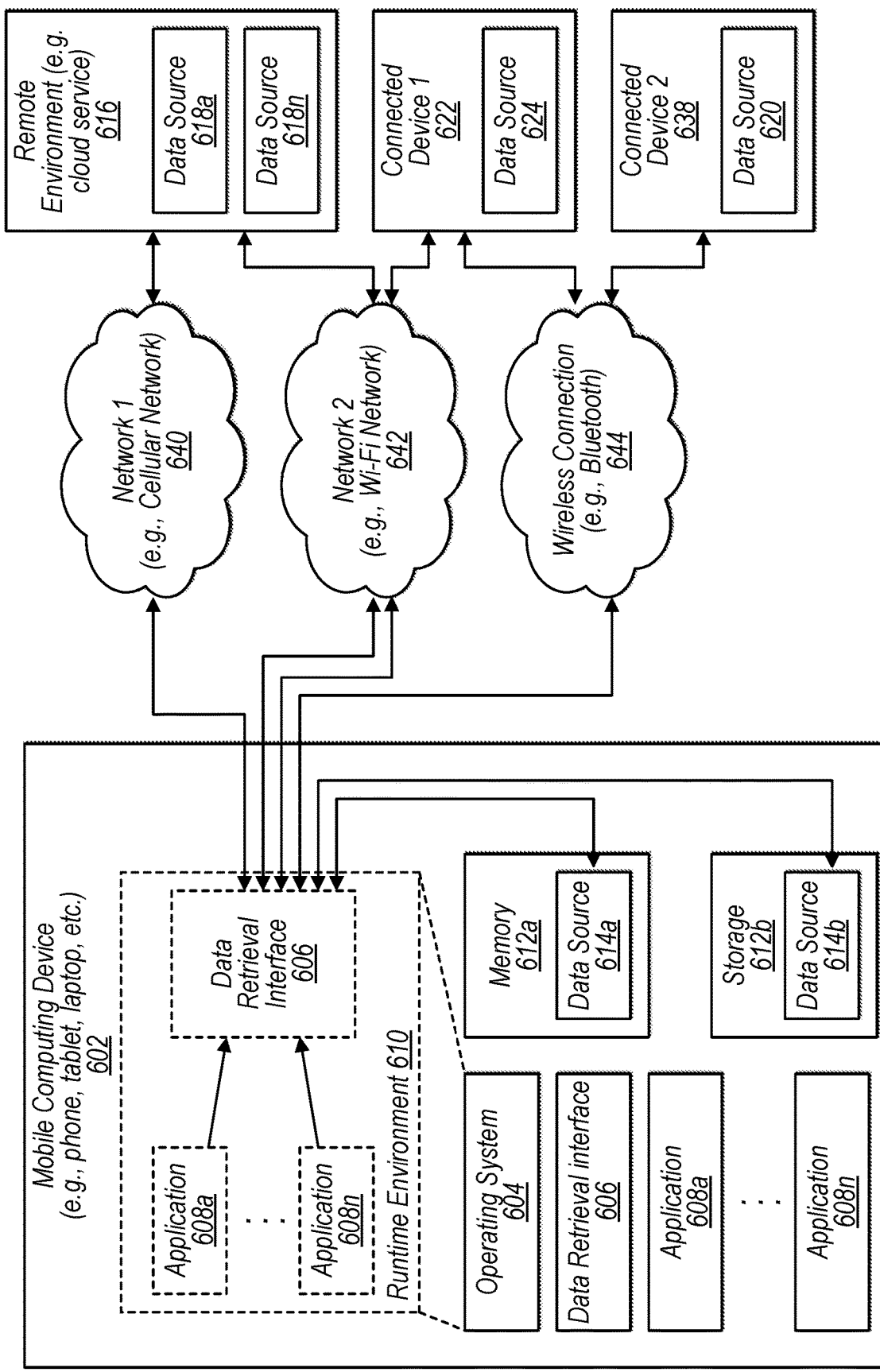
FIG. 6 illustrates an example wherein a standardized data retrieval interface is implemented in a runtime environment of a mobile device, according to some embodiments.

FIG. 6 illustrates an example wherein a standardized data retrieval interface is implemented in a runtime environment of a mobile device, according to some embodiments.

Data retrieval interface 606 may be similar to data retrieval interface 106 described in FIGS. 1A and 1B.

In some embodiments, a data retrieval interface 606 may be implemented in a runtime environment 610 of a mobile computing device 602, such as a mobile phone, tablet, laptop, etc. The mobile computing device 602 may include one or more processors that execute an operating system code 604 as well as applications 608a through 608n. Additionally, the mobile computing device 602 may include local data sources 614a and 614b, which may be included in a local memory 612a or a local storage 612b, respectively.

The mobile computing device 602 may be connected to a remote environment 616, such as a cloud service provider network via a network connection 640, such as a cellular network connection, or via a network connection 642 such as a Wi-Fi internet connection. The remote environment 616 may include data sources 618a through 618n.

Additionally, the mobile computing device 602 may be connected to other devices, such as an internet of things (IoT) enabled device, an infotainment system of a vehicle, another computing device, etc. For example, mobile computing device 602 is connected to connected device 622 that includes data source 624 via network connection 642. Additionally, mobile computing device 602 is connected to connected device 622 via a second connection (e.g. wireless connection 644). Also, mobile computing device 602 is connected to connected device 638 which includes data source 620 via wireless connection 644.

In some embodiments, any of data sources 614a, 614b, 618a through 618n, 620, and 624 may include data responsive to a request received from one of applications 608a through 608n. In such embodiments, data retrieval interface 606 may select a given one of the data sources 614a, 614b, 618a through 618n, 620, or 624 to send a request for data to in order to answer the query from applications 608a through 608n based on prioritization parameters such as latency, connectivity, costs, etc.

Figure 7:
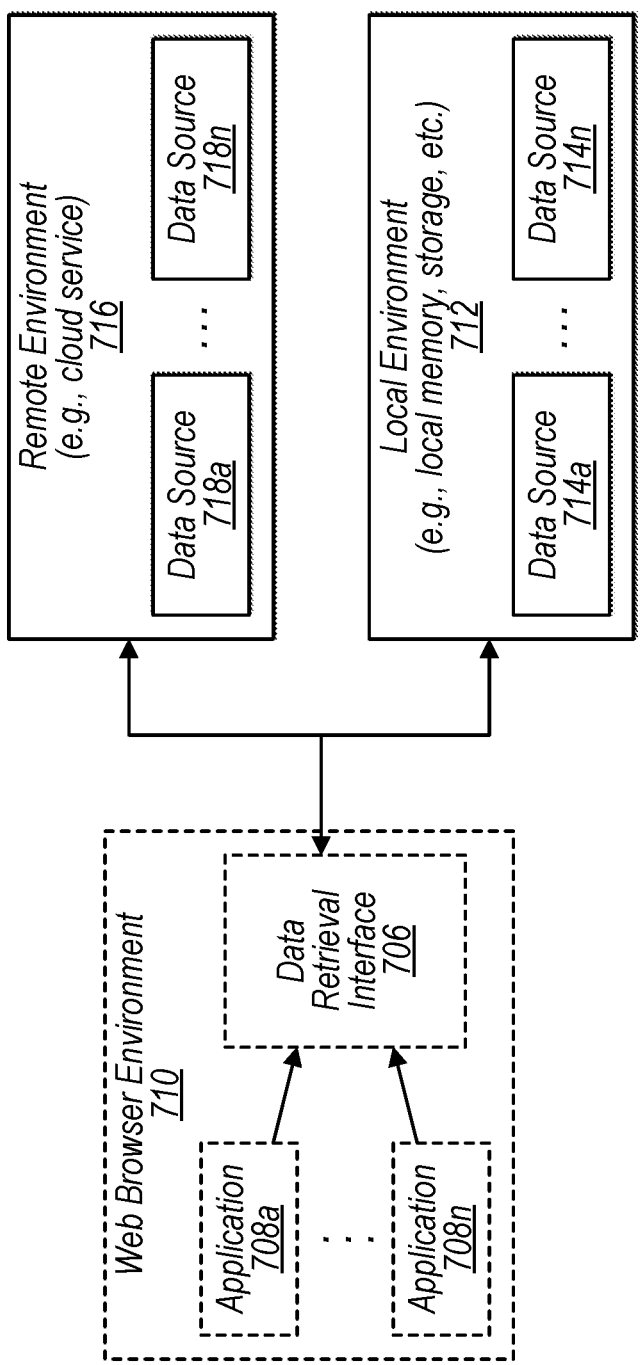
FIG. 7 illustrates an example wherein a standardized data retrieval interface is implemented in a web browser environment, according to some embodiments.

FIG. 7 illustrates an example wherein a standardized data retrieval interface is implemented in a web browser environment, according to some embodiments.

In some embodiments, a standardized data retrieval interface such as data retrieval interface 106 described in FIGS. 1A and 1B may execute in a web browser environment.

For example, data retrieval interface 706, which may be similar to data retrieval interface 106, may execute in web browser environment 710 and may receive queries from applications 708a through 708n executing in web browser environment 710. In some embodiments, data retrieval interface 706 may select a given data source from which to request data in order to answer a query from applications 708a through 708n, wherein the data source is selected from amongst remote and local data sources, such as data sources 718a through 718n in remote environment 716 and data sources 714a through 714n in local environment 712. For example, in some embodiments, local environment 712 may include data sources implemented on local physical hardware that is local to physical hardware that implements the web browser environment 710 and remote environment 716 may include remote hardware, such as computing devices of a cloud service provider network. As described above, the data retrieval interface 706 may prioritize the various available data sources based on connectivity, cost, latency, and/or other specified parameters.

Figure 8:
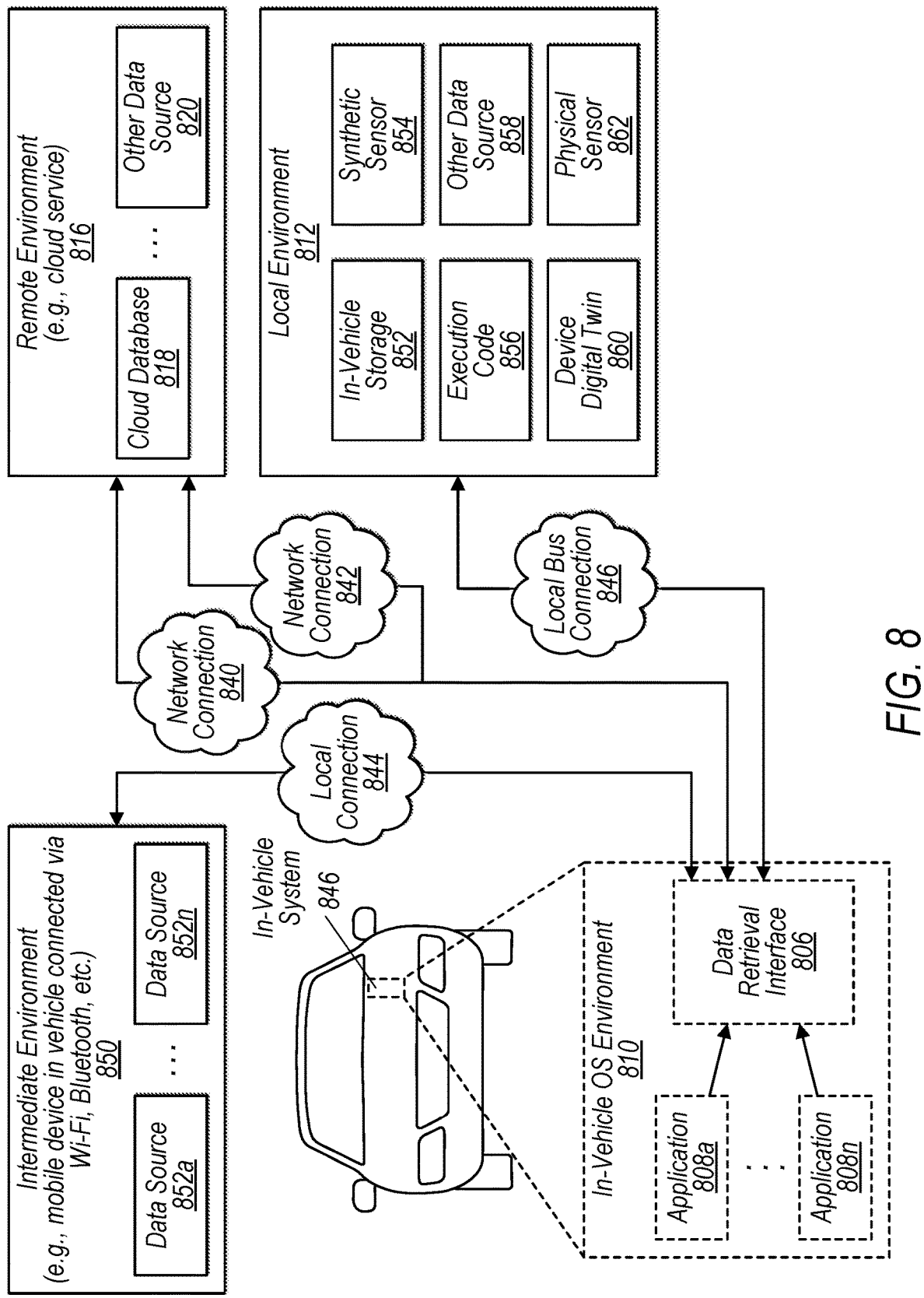
FIG. 8 illustrates an example wherein a standardized data retrieval interface is implemented in an in-vehicle operating system environment of a vehicle, according to some embodiments.

In some embodiments, the web browser environment 710 may be implemented in a mobile computing device, such as described in FIG. 6 or in a console of an in-vehicle system of a vehicle as described in FIG. 8. Also web browser environment 710 may be implemented in various other hardware configurations.

FIG. 8 illustrates an example wherein a standardized data retrieval interface is implemented in an in-vehicle operating system environment of a vehicle, according to some embodiments.

In some embodiments, a standardized data retrieval interface, such as data retrieval interface 106, may be implemented in an in-vehicle system that may operate in a gateway domain or infotainment domain of a vehicle. For example, in-vehicle operating system environment 810 may be implemented in an in-vehicle system 846 and data retrieval interface 806 included in in-vehicle operating system 810 may be similar to data retrieval interface 106 described in regards to FIGS. 1A and 1B. In some embodiments, a vehicle may include other computing devices outside of the gateway or infotainment domain. These other computing devices may also be local data sources. For example, in some embodiments, in-vehicle system 846 may be implemented in any of an infotainment domain/OS, a cockpit or control domain/OS, a communications domain/OS, a safety system domain/OS, a vehicle server domain/OS, a telematics communication unit domain/OS, an advanced drive assistance system domain/OS, a cloud domain/OS, an edge processing domain/OS (which may be implemented in part in a cellular communications tower, etc.), and/or a gateway domain/OS, etc.

In some embodiments, applications 808a through 808n may execute in in-vehicle operating system environment 810 and may submit data queries to data retrieval interface 806. The data retrieval interface may select a data source from which to obtain data to satisfy the query from a plurality of data sources, such as local data sources, remote data sources, and/or data sources in an intermediate environment, such as data sources connected to the in-vehicle infotainment system via a local wired or wireless connection.

For example, local environment 812 may include data sources in a same computing device as the computing device that implements the in-vehicle infotainment system 846 and/or another computing device installed in the vehicle. In some embodiments, the local environment 812 may be connected with in-vehicle operating system environment 810 via a local bus connection 846.

In some embodiments, the local environment 812 may include a local in-vehicle storage 852, such as a storage or memory device of a computer system installed in the vehicle. The local environment 812 may also include a physical sensor 862 and/or synthetic sensor 854 of the vehicle. In some embodiments a synthetic sensor may be implemented in an orchestration environment of a vehicle and may determine a synthetic sensor output based on applying synthetic sensor logic to one or more inputs received from a physical sensor or other input source.

In some embodiments, local environment 812 may include an execution code 856 that executes on a computer of the vehicle, wherein an output of the execution code 856 is a data source available to the data retrieval interface 806. Also another data source, such as a computing device or sensors in another domain of the vehicle may be another data source 858 available to the data retrieval interface 806.

Additionally, in some embodiments, an in-vehicle infotainment system may maintain a device digital twin, such as for the vehicle, wherein the device digital twin represents a current state of the vehicle such as battery life, miles, etc. In some embodiments, the device digital twin may also or alternatively be implemented in a remote environment. In some embodiments, a local device digital twin and a remote device digital twin may be maintained and synchronized. In some embodiments, a device digital twin 860 may be another local data source available to the data retrieval interface 806.

In some embodiments, an intermediate environment, such as intermediate environment 850, may include data sources with a local connection to the in-vehicle infotainment system 846 such as a mobile device, laptop, tablet, etc. connected to the in-vehicle infotainment system via a wireless or wired local connection 844, such as a Wi-Fi or Bluetooth connection, as a few examples. For example intermediate environment 850 includes data sources 852a through 852n that are available to data retrieval interface 806.

Remote environment 816 includes data sources that are connected to in-vehicle infotainment system 846 via a network connection, such as a network connection 840, which may be a cellular network connection and such as network connection 842 which may be a an internet connection. In some embodiments, the data sources of remote environment 816 may include a cloud database 818 and other data sources 820, which may be available data sources for data retrieval interface 806 to request for data in order to respond to a query from applications 808a through 808n.

As an example, application 808a may query data retrieval interface 806 for the driver of the vehicle's phone number. For example, application 808a may be a food pick-up app and may be attempting to contact the driver to let the driver know the driver's order is ready to be picked up. The data retrieval interface 806 may first attempt to retrieve data comprising the driver's phone number from local environment 812, such as an address book stored in in-vehicle storage 852. If this attempt is unsuccessful, the data retrieval interface may next query devices in intermediate environment 850, such as a mobile phone, tablet, laptop, etc. within wireless communication range of the vehicle. If this is also unsuccessful, the data retrieval interface 806 may next attempt to fetch the needed data from remote environment 816. For example, the driver's profile may be stored in cloud database 818. In some embodiments, the data retrieval interface may attempt to contact the cloud database 818 using a low cost network connection, such as a Wi-Fi connection (e.g. network connection 842). However, if the network connection 842 is not available, the data retrieval interface 806 may contact cloud database 818 via a cellular connection or other slightly higher cost connection (e.g. network connection 840). The data retrieval interface may then provide the driver's phone number retrieved from cloud database 818 to the requesting application 808a.

Note that the priorities described in the above example are given as one of multiple possible priority schemes that may be used by data retrieval interface 806 to select a data source from which to obtain the driver's phone number.

Figure 9:
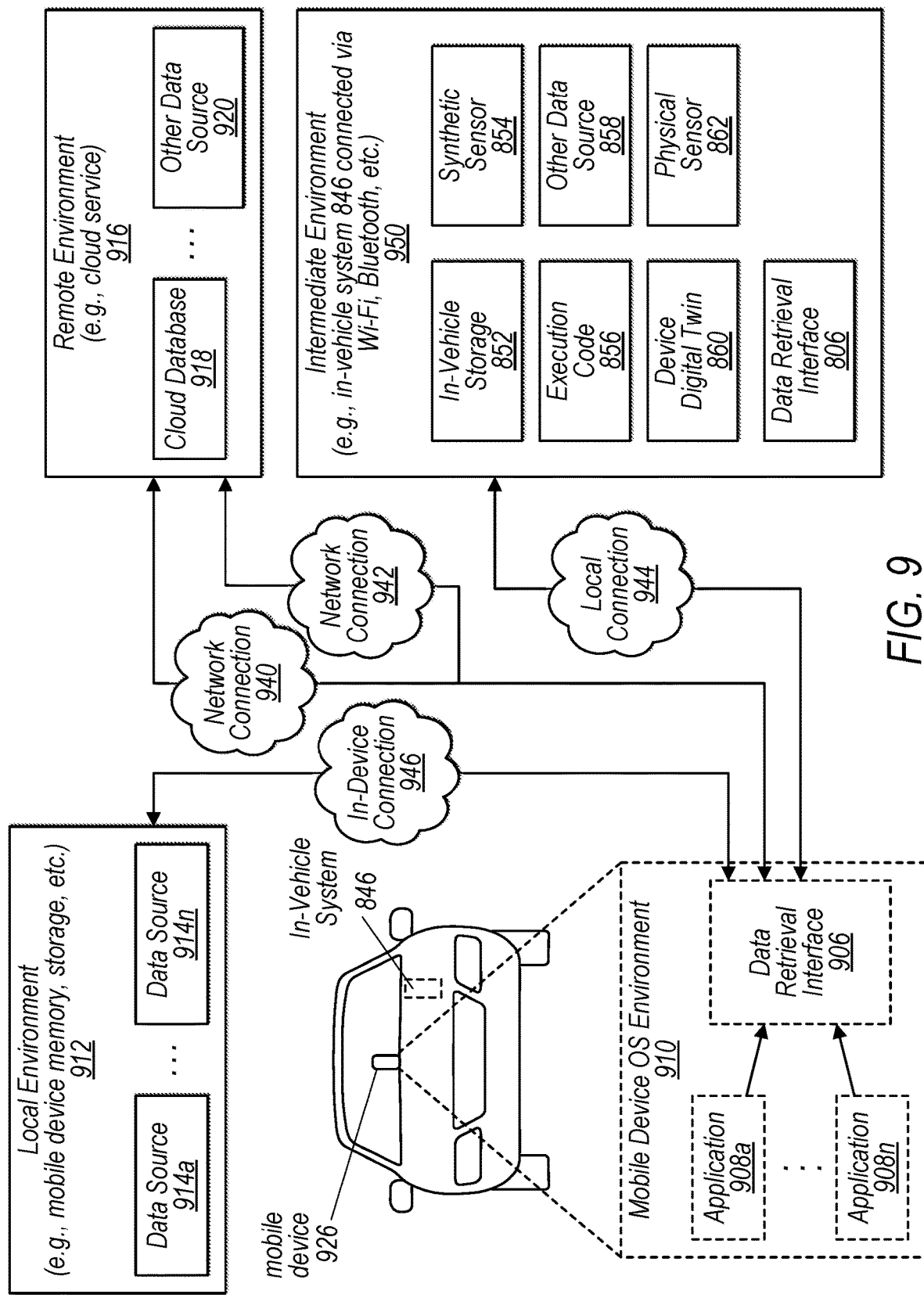
FIG. 9 illustrates an example wherein a standardized data retrieval interface is implemented in a runtime environment of a mobile device, wherein data sources associated with a vehicle are data sources accessible by the standardized data retrieval interface of the mobile device, according to some embodiments.

FIG. 9 illustrates an example wherein a standardized data retrieval interface is implemented in a runtime environment of a mobile device, wherein data sources associated with a vehicle are data sources accessible by the standardized data retrieval interface of the mobile device, according to some embodiments.

In FIG. 9, data retrieval interface 906 is included in a mobile device operating system environment 910 of a mobile device 926 that is located in a vehicle that includes in-vehicle infotainment system 846.

Similar to the example given above, one of applications 908a through 908n may submit a query to data retrieval interface 906 for the driver's phone number. Data retrieval interface 906 may first attempt to retrieve the requested data from a local environment 912 connected via in-device connection 946, which may include data sources 914a through 914n which may be a local memory or storage of the mobile device 926.

Also, the data retrieval interface may attempt to retrieve the requested data from an intermediate environment 950, such as the in-vehicle infotainment system 846 which is connected to the mobile device via a local wired or wireless connection 944, such as a Wi-Fi, Bluetooth, or other local connection.

Additionally, the data retrieval interface 906 may attempt to retrieve the requested data from remote environment 916 via network connection 942 which may be a lower cost connection, such as a Wi-Fi enabled internet connection or via network connection 940 which may be a higher cost connection, such as cellular based internet connection. In some embodiments, remote environment 916 may include a cloud database 918 and other data sources 920.

In some embodiments, standardized data retrieval interfaces may be chained and proxy requests between themselves. For example, a prioritization performed by data retrieval interface 906 may select data retrieval interface 806 in intermediate environment 950 as a selected data source, and data retrieval interface 806 may select a data source as described in FIG. 8. For example, a wireless data plan for a vehicle may include lower cost data transmission than a data plan for mobile device 926. Thus, instead of mobile device 926 using higher cost network connection 940 to retrieve data from remote environment 916, the data retrieval interface 906 may proxy the query to data retrieval interface 806 which may use a slightly lower cost network connection 840 which falls under the vehicle's data plan as opposed to the mobile device's data plan. Note that other combinations of chaining may be employed for various other reasons.

Chaining also provides other advantages. For example, data retrieval interface 906 may not need to be updated with the latest connection details for connecting to remote environment 916, but may instead rely on data retrieval interface 806 to manage these details. Thus the universe of data retrieval interfaces that need to be updated in response to changes in remote environment 916 may be reduced by using chaining.

As another example, application 908a may submit a query to data retrieval interface 906 to determine the battery level of the vehicle. If the mobile device is located in the vehicle as shown in FIG. 9, the data retrieval interface may select a local device digital twin 860 or physical sensor 862 as a data source from which to obtain the battery level.

However, if mobile device 926 is out of range to communicate with intermediate environment 960 via local connection 944, the data retrieval interface 906 may instead select a remote device digital twin which may be maintained in remote environment 916, such as other data source 920. Thus different data sources may be selected to respond to the same query based on where the mobile device 926 is located relative to the vehicle.

Also, as another example, if the battery level is not stored in the remote environment 916, a data retrieval interface implemented in the remote environment 916 may retrieve the requested data from the device digital twin 860 or in-vehicle storage 852 via network connection 940 or 942. For example the data retrieval interface 906 may proxy the query to a chained data retrieval interface (not shown in FIG. 9) in remote environment 916 which may select the in-vehicle storage 852 or device digital twin 860 as a selected data source from which to obtain the requested data.

Figure 10:
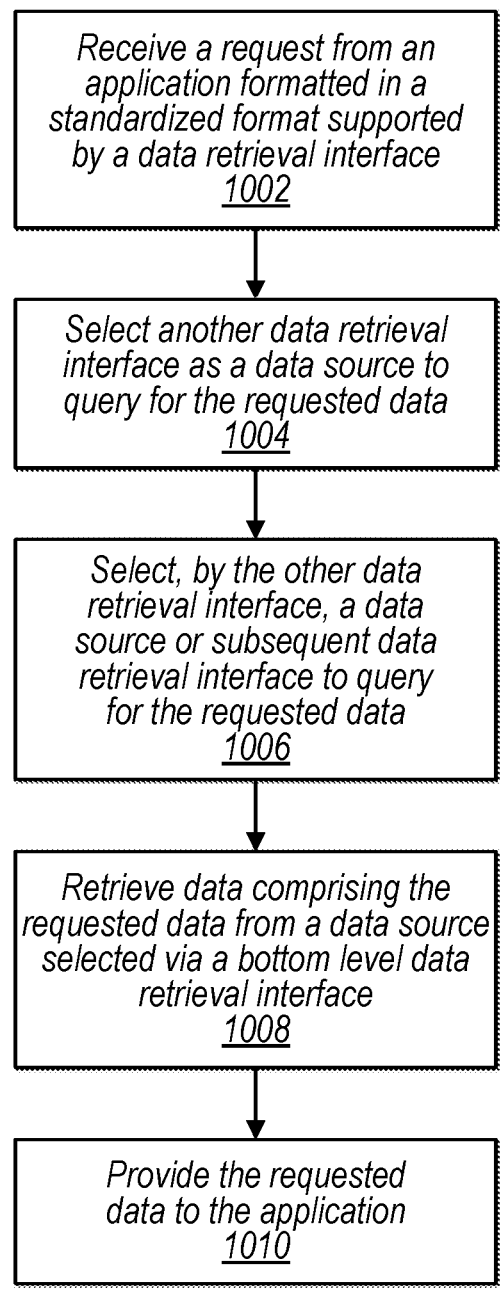
FIG. 10 illustrates an example process wherein queries are chained between multiple standardized data retrieval interfaces, according to some embodiments.

FIG. 10 illustrates an example process wherein queries are chained between multiple standardized data retrieval interfaces, according to some embodiments.

At 1002, a standardized data retrieval interface receives a request from an application formatted in a standardized format supported by a data retrieval interface.

At 1004, the standardized data retrieval interface selects another standardized data retrieval interface as a data source to query for the requested data. Note that in some embodiments, multiple (e.g. more than two) standardized data retrieval interfaces may be chained together.

At 1006, the other (chained) data retrieval interface selects a data source or subsequent data retrieval interface to query for the requested data.

At 1008, the other or bottom level (chained) data retrieval interface retrieves data comprising the requested data and passes it back up the chain to the original data retrieval interface that received the query from the application.

At 1010, the original data retrieval interface that received the query from the application provides the requested data to the application.

Figure 11:
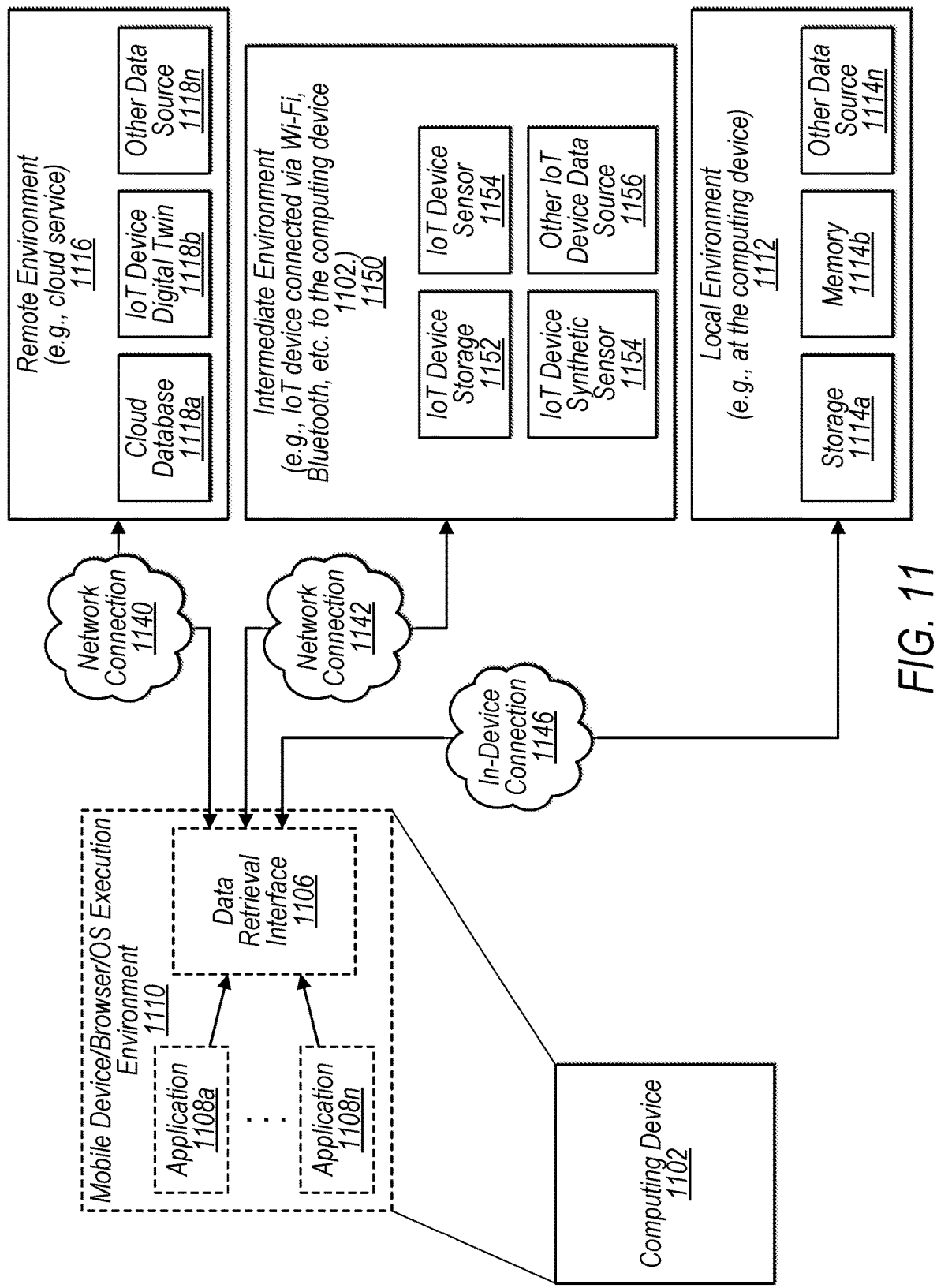
FIG. 11 illustrates an example wherein data sources associated with an internet of things (IoT) enabled device are data sources accessible by a standardized data retrieval interface, according to some embodiments.

FIG. 11 illustrates an example wherein data sources associated with an internet of things (IoT) enabled device are data sources accessible by a standardized data retrieval interface, according to some embodiments.

In some embodiments, a computing device in which a data retrieval interface is implemented may be connected to an internet of things (IoT) enabled device. For example computing device 1102 is connected to an intermediate environment 1150 comprising an IoT device via network connection 1142, which may be a Wi-Fi, Bluetooth, or other wired or wireless connection.

Mobile device/browser/OS execution environment 1110 executes on computing device 1102 and includes applications 1108a through 1108n and data retrieval interface 1106. In some embodiments, applications 1108a through 1108n may include an application that provides a control console for the connected IoT enabled device.

In some embodiments, data retrieval interface 1106 may access data sources in a local environment 1112 via an in-device connection 1146, such as storage 1114a, memory 1114b, or other data source 1114n. In some embodiments, other data source 1114n may include a local device digital twin for the IoT device stored at the computing device 1102.

Also, data retrieval interface 1106 may access data sources in the intermediate environment 1150 connected via network connection 1142, such as IoT device storage 1152, IoT device sensor 1154, IoT device synthetic sensor 1154, or other IoT device data source 1156.

Additionally, data retrieval interface 1106 may access data sources in remote environment 1116 via network connection 1140, which may be an internet connection. The data sources included in remote environment 1116 may include cloud database 1118a, IoT remote device digital twin 1118b or other data sources 1118n.

In some embodiments, data retrieval interface 1106 may prioritize the respective data sources based on connectivity, latency, and/or cost when selecting a data source from which to retrieve requested data.

In some embodiments, a data retrieval interface may interact with various types of IoT devices such as industrial IoT devices, smart-home IoT devices, automotive IoT devices, etc.

For example, in response to a query for a battery level of the IoT device received from application 1108a, data retrieval interface 1106 may first attempt to determine if the battery level is stored in a local device digital twin, such as other data source 1114n. If not stored locally, the data retrieval interface may attempt to retrieve the battery level information from IoT device sensor 1154 in intermediate environment 1150. However, if network connection 1142 is not available, the data retrieval interface 1106 may retrieve the battery level information from IoT device digital twin 1118b in remote environment 1116 connected via network connection 1140.

Example Computer System

Figure 12:
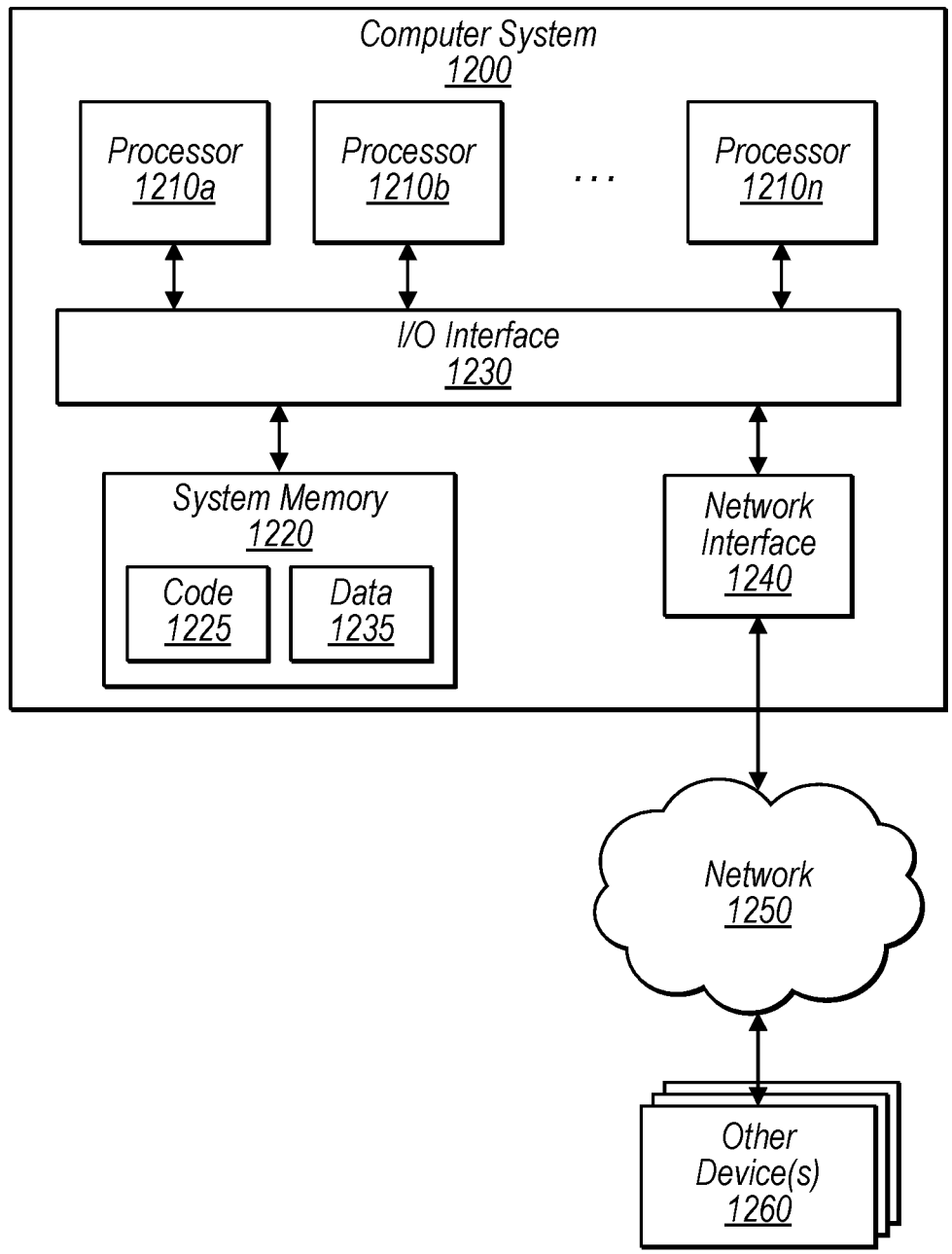
FIG. 12 is a block diagram illustrating an example computer system that implements some or all of the techniques described herein, according to some embodiments.

Any of various computer systems may be configured to implement processes associated with a standardized data retrieval interface, a data source for a standardized data retrieval interface, an operating system in a vehicle or device, or any other component of the above figures. For example, FIG. 12 is a block diagram illustrating an example computer system that implements some or all of the techniques described herein, according to some embodiments. In various embodiments, the data retrieval interfaces, the runtime environments, the data sources, the synthetic sensor orchestration environments, the provider networks that implement the data sources, the operating system in a vehicle or device, or any other component of the above FIGS. 1-11 may each include one or more computer systems 1200 such as that illustrated in FIG. 12.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230. In some embodiments, computer system 1200 may be illustrative of servers implementing enterprise logic or downloadable application, while in other embodiments servers may include more, fewer, or different elements than computer system 1200.

In various embodiments, computing device 1200 may be a uniprocessor system including one processor or a multiprocessor system including several processors 1210A-1210N (e.g., two, four, eight, or another suitable number). Processors 1210A-1210N may include any suitable processors capable of executing instructions. For example, in various embodiments, processors 1210A-1210N may be processors implementing any of a variety of instruction set architectures (ISAs), such as the x86, PowerPC, SPARC, or MIPS ISAs, or any other suitable ISA. In some embodiments, processors 1210A-1210N may include specialized processors such as graphics processing units (GPUs), application specific integrated circuits (ASICs), etc. In multiprocessor systems, each of processors 1210A-1210N may commonly, but not necessarily, implement the same ISA.

System memory 1220 may be configured to store program instructions and data accessible by processor(s) 1210A-1210N. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1220 as code (i.e., program instructions) 1225 and data 1226.

In one embodiment, I/O interface 1230 may be configured to coordinate I/O traffic between processors 1210A-1210N, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, I/O interface 1230 may include support for devices attached via an automotive CAN bus, etc. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processors 1210A-1210N.

Network interface 1240 may be configured to allow data to be exchanged between computing device 1200 and other devices 1260 attached to a network or networks 1250. In various embodiments, network interface 1240 may support communication via any suitable wired or wireless general data networks, such as types of Ethernet networks, cellular networks, Bluetooth networks, Wi-Fi networks, Ultra-wideband Networks, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-readable (i.e., computer-accessible) medium configured to store program instructions and data as described above for implementing embodiments of the corresponding methods, systems, and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1200 via I/O interface 1230. One or more non-transitory computer-readable storage media may also include any volatile or non-volatile media such as RAM (e.g. SDRAM, DDR SDRAM, RDRAM, SRAM, etc.), ROM, etc., that may be included in some embodiments of computing device 1200 as system memory 1220 or another type of memory. Further, a computer-readable medium may include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices configured to implement a runtime environment comprising a plurality of applications executing in the runtime environment, wherein the runtime environment further comprises a data retrieval interface configured to:
receive a query for data from a given one of the applications executing in the runtime environment, wherein the query is formatted in a standardized format supported by the data retrieval interface;
select a data source from which to retrieve the data requested in the query, wherein the selection is based on connectivity or latency between the runtime environment and respective ones of a plurality of data sources;
retrieve data comprising the requested data from the selected data source; and
provide the requested data in response to the query,
wherein at least some of the plurality of data sources are implemented using hardware in a local environment, local to where the one or more computing devices that implement the runtime environment are located; and
wherein at least some of the plurality of data sources are implemented on hardware that is located remotely from the local environment where the one or more computing devices that implement the runtime environment are located.

2. The system of claim 1, wherein the data comprising the requested data is available to be retrieved from more than one of the plurality of data sources, and wherein the data retrieval interface is configured to:
prioritize for selection a first one of the data sources from which the requested data is available to be retrieved that has a shorter data retrieval latency over another one of the data sources from which the requested data is available to be retrieved that has a longer data retrieval latency.

3. The system of claim 1, wherein the data comprising the requested data is stored at, or can be queried from, more than one of the plurality of data sources; and
wherein the data retrieval interface is configured to:
attempt to retrieve the data comprising the requested data from a given one of the more than one data sources; and
if unable to retrieve the data comprising the requested data from the given one of the more than one data sources, retrieve other data comprising the requested data from another one of the more than one data sources.

4. The system of claim 1, wherein:
the one or more computing devices that implement the runtime environment are located in a vehicle;
one or more of the local data sources are located in the vehicle; and
one or more respective ones of the remote data sources comprise:
a mobile computing device with a communication connection to the one or more computing devices of the vehicle;
a remote computing device connected to the one or more computing devices of the vehicle via a network connection; or
another computing device of the vehicle.

5. The system of claim 1, wherein:
the one or more computing devices that implement the runtime environment are included in a mobile computing device;
one or more of the local data sources are located in the mobile computing device; and one or more respective ones of the remote data sources comprise:
  a computing device of a vehicle, wherein the mobile computing device is connected to the computing device of the vehicle via a wired or wireless connection; or
  a remote computing device connected to the mobile computing device via a network connection.

6. The system of claim 1, wherein:
the one or more computing devices that implement the runtime environment are connected to an internet of things (IoT) enabled device; and
one or more respective ones of the remote data sources comprise:
  the IoT enabled device;
  another device connected to the IoT enabled device;
  a remote computing device connected to the IoT enabled device via a network connection; or
  a remote computing device storing a digital twin for the IoT enabled device.

7. One or more non-transitory, computer-readable storage media, storing program instructions that, when executed on or across one or more computing devices, cause the one or more computing devices to:
  receive a request for data, at a data retrieval interface included in a runtime environment from a separate application executing in the runtime environment, wherein the request is formatted in a standardized format supported by the data retrieval interface;
  select a data source from which to retrieve the requested data, wherein the selection is based on connectivity or latency between the data retrieval interface and respective ones of a plurality of data sources;
  retrieve data comprising the requested data from the selected data source; and
  provide the requested data to the separate application in response to the request.

8. The one or more non-transitory computer-readable storage media of claim 7, wherein the program instructions when executed on or across one or more computing devices, cause the one or more computing devices to:
  prioritize for selection a first one of the data sources from which the requested data is available to be retrieved that has a shorter data retrieval latency over another one of the data sources from which the requested data is available to be retrieved that has a longer data retrieval latency.

9. The one or more non-transitory computer-readable storage media of claim 7, wherein the program instructions when executed on or across one or more computing devices, cause the one or more computing devices to:
  prioritize for selection a first one of the data sources from which the requested data is available to be retrieved at a lower network cost than another one of the data sources from which the requested data is available to be retrieved at a higher network cost.

10. The one or more non-transitory computer-readable storage media of claim 7, wherein the program instructions when executed on or across one or more computing devices, cause the one or more computing devices to:
  receive one or more prioritization criteria for use in selecting the data source from which to retrieve the requested data;
  prioritize for selection a first one of the data sources from which the requested data is available to be retrieved over another one of the data sources from which the requested data is available to be retrieved based on the received one or more prioritization criteria.

11. The one or more non-transitory computer-readable storage media of claim 10, wherein the one or more prioritization criteria are received from an administrator of the data retrieval interface.

12. The one or more non-transitory computer-readable storage media of claim 10, wherein the one or more prioritization criteria are indicated by the separate application.

13. The one or more non-transitory computer-readable storage media of claim 7, wherein the program instructions when executed on or across one or more computing devices, cause the one or more computing devices to:
  convert the request formatted in the format supported by the data retrieval interface into a request formatted in accordance with a request format supported by the selected data source;
  send a data request to the selected data source formatted in accordance with the request format supported by the selected data source, wherein the data retrieval interface is configured to convert a received request into a plurality of different request formats supported by the plurality of data sources.

14. The one or more non-transitory computer-readable storage media of claim 7, wherein the plurality of data sources comprise one or more of:
  a physical sensor of a vehicle;
  a synthetic sensor implemented in a software orchestration environment of the vehicle;
  a local data storage device of the vehicle; or
  a data source implemented using remote hardware of a cloud service provider network.

15. The one or more non-transitory computer-readable storage media of claim 7, wherein the plurality of data sources comprise one or more of:
  a physical sensor of an interne of things (IoT) enabled device;
  a data storage of the IoT enabled device; or
  a data source implemented using remote hardware of a cloud service provider network.

16. The one or more non-transitory computer-readable storage media of claim 7, wherein the program instructions when executed on or across one or more computing devices, cause the one or more computing devices to:
  store data indicating latencies between the data retrieval interface and the respective ones of the plurality of data sources, wherein the data indicating the latencies is determined based on retrieval latencies of prior requests for data from the plurality of data sources, wherein the selection of the data source from which to retrieve the requested data is based on the stored data indicating the latencies between the data retrieval interface and the respective ones of the plurality of data sources.

17. The one or more non-transitory computer-readable storage media of claim 16, wherein the program instructions:
  determine the data indicating the respective latencies based on completed requests for data;
  store the determined data indicating the respective latencies in a cache for a period of time; and
  subsequent to an expiration of the period of time, determine updated data indicating the respective latencies based on additional completed requests for data.

18. The one or more non-transitory computer-readable storage media of claim 16, wherein the program instructions:

determine the data indicating the respective latencies based on completed requests for data;

store the determined data indicating the respective latencies in a cache; and update the determined data indicating latencies on a running basis for subsequently completed requests for data.

19. A method, comprising:

receiving a request for data, at a data retrieval interface included in a runtime environment from a separate application executing in the runtime environment, wherein the request is formatted in a standardized format supported by the data retrieval interface;

selecting a data source from which to retrieve the requested data, wherein the selection is based on connectivity or latency between the data retrieval interface and respective ones of a plurality of data sources;

retrieving data comprising the requested data from the selected data source; and providing the requested data to the separate application in response to the request.

20. The method of claim 19, wherein:

at least some of the plurality of data sources are implemented using hardware in a local environment, local to one or more computing devices that implement the data retrieval interface; and at least some of the plurality of data sources are implemented on hardware that is located remotely from the local environment.

21. The method of claim 20, further comprising:

storing the retrieved data comprising the requested data in a data storage included in the local environment.

22. The method of claim 19, wherein the selected location is another data retrieval interface, the method further comprising:

selecting, performed by the other data retrieval interface, another data source from which to retrieve the requested data; and providing, performed by the other data retrieval interface, the data comprising the requested data to the data retrieval interface.

* * * * *